United States Patent
Wijekoon et al.

(10) Patent No.: US 12,424,946 B2
(45) Date of Patent: Sep. 23, 2025

(54) METHOD FOR OPERATING A CONVERTER, CONTROL UNIT FOR PERFORMING THE METHOD AND CONVERTER

(71) Applicant: HUAWEI TECHNOLOGIES CO., LTD., Guangdong (CN)

(72) Inventors: Piniwan Thiwanka Bandara Wijekoon, Nuremberg (DE); Anatolii Tcai, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 18/211,048

(22) Filed: Jun. 16, 2023

(65) Prior Publication Data

US 2023/0336070 A1    Oct. 19, 2023

Related U.S. Application Data

(63) Continuation of application No. PCT/EP2020/087316, filed on Dec. 18, 2020.

(51) Int. Cl.
  *H02M 7/483* (2007.01)
  *H02M 1/32* (2007.01)
  (Continued)

(52) U.S. Cl.
  CPC ......... *H02M 7/4837* (2021.05); *H02M 1/327* (2021.05); *H02M 7/487* (2013.01); *H02M 3/07* (2013.01)

(58) Field of Classification Search
  CPC .......................... H02M 7/4837; H02M 4/487
  See application file for complete search history.

(56) References Cited

U.S. PATENT DOCUMENTS

| | | |
|---|---|---|
| 2014/0293667 A1 | 10/2014 | Schroeder et al. |
| 2017/0331374 A1 | 11/2017 | Yerby |
| | (Continued) | |

FOREIGN PATENT DOCUMENTS

| | | |
|---|---|---|
| EP | 3329585 B1 | 9/2019 |
| KR | 20150078815 A | 7/2015 |
| WO | 2016144561 A9 | 12/2016 |

OTHER PUBLICATIONS

Wang Kui et al: "Voltage Balancing Control of a Four-Level Hybrid-Clamped Converter Based on Zero-Sequence Voltage Injection Using Phase-Shifted PWM", IEEE Transactions on Power Electronics, Institute of Electrical and Electronics Engineers, USA, vol. 31. No. 8, Aug. 1, 2016 (Aug. 1, 2016), pp. 5389-5399, XP011608637.

(Continued)

*Primary Examiner* — Jue Zhang
(74) *Attorney, Agent, or Firm* — WOMBLE BOND DICKINSON (US) LLP

(57) ABSTRACT

The present disclosure relates to a method for operating a converter. The converter includes a first and second input terminal for receiving a DC voltage, an output terminal for providing an output voltage variable between a first voltage level and a second voltage level, a first and second series connection of two or more switches that are semiconductor switches, and one or more capacitor units. The method includes the following operation: compensating different power losses of the switches by controlling the switches such that one or more of the one or more capacitor units are charged above a respective third voltage level, and/or that one or more of the one or more capacitor units are charged below a respective third voltage level, so that the DC voltage is not equally distributed to the switches.

20 Claims, 13 Drawing Sheets

(51) Int. Cl.
  *H02M 3/07* (2006.01)
  *H02M 7/487* (2007.01)

(56) References Cited

U.S. PATENT DOCUMENTS

2020/0195133 A1   6/2020  Bonnano et al.
2020/0350817 A1  11/2020  De et al.

OTHER PUBLICATIONS

Vechalapu, K et al, Comparative performance evaluation of series connected 15 kV SiC IGBT devices and 15 kV SiC MOSFET devices for MV power conversion system , 2016 IEEE Energy Conversion Congress and Exposition (ECCE), Sep. 18-22, 2016, total 8 pages.

Milovanovic Stefan et al: "On Power Scalability of Modular Multilevel Converters: Increasing Current Ratings Through Branch Paralleling", IEEE Power Electronics Magazine, IEEE, USA, vol. 7. No. 2, Jun. 1, 2020 (Jun. 1, 2020). pp. 53-63, XP011793975.

P. Czyz et al, "New 40kV / 300KVA Quasi-2-Level Operated 5-Level Flying Capacitor SiC "Super-Switch" IPM", ICPE 2019—ECCE Asia, May 27-30, 2019, total 9 pages.

Goncalves Jorge et al: "Submodule Temperature Regulation and Balancing in Modular Multilevel Converters", IEEE Transactions on Inoustrial Electronics, IEEE Service Center, Piscataway, NJ , USA, vo 1. 65. No. 9, Sep. 1, 2018 (Sep. 1, 2018), pp. 7085-7094, XP011682690.

M. Schweizer et al, "Heatsink-less Quasi 3-level flying capacitor inverter based on low voltage SMD MOSFETs", 2017 19th European Conference on Power Electronics and Applications (EPE 17), Sep. 11-14, 2017, total 10 pages.

S. Gierschner et al, "Quasi-Two-Level Operation of a Five-Level Flying-Capacitor Converter," 2019 21st European Conference on Power Electronics and Applications (EPE), Sep. 3-5, 2019, total 9 pages.

Mersche Stefan et al, "Quasi-Two-Level Flying-Capacitor-Converter for Medium Voltage Grid Applications", 2019 IEEE Energy Conversion Congress and Exposition (ECCE 19), Sep. 29, 2019-Oct. 3, 2019, total 8 pages.

I. A. Gowaid et al, "Quasi Two-Level Operation of Modular Multilevel Converter for Use in a High-Power DC Transformer With DC Fault Isolation Capability", IEEE Trans. on Power Electron., Jan. 2015, total 17 pages.

J. Kucka et al, "Control for quasi two-level PWM operation of modular multilevel converter", in Proc. IEEE 25th Int. Symp. Ind. Electron., Jun. 2016, pp. 448-453.

J. Kucka et al, "Common-mode voltage injection techniques for quasi-two-level PWM-operated modular multilevel converters", 2018 International Power Electronics Conference, May 20-24, 2018, pp. 287-294.

J. Kucka et al, "Improved Current Control for a Quasi-Two-Level PWM-Operated Modular Multilevel Converter", IEEE Trans. on Power Electron., Jul. 2020, pp. 6842-6853.

METHOD FOR OPERATING A CONVERTER, CONTROL UNIT FOR PERFORMING THE METHOD AND CONVERTER

CROSS-REFERENCE TO RELATED APPLICATIONS

This application is a continuation of International Application No. PCT/EP2020/087316, filed on Dec. 18, 2020, the disclosure of which is hereby incorporated by reference in its entirety.

TECHNICAL FIELD

The present disclosure relates to a method for operating a converter, to a control unit for a converter, wherein the control unit is configured to perform such a method, and to a converter. The converter may be a multilevel converter.

BACKGROUND

The field of the present disclosure is related to converters (may be referred to as power converters) and a method for operating such converters. Such converters may be used in power supplies, such as data centre power supplies, solar photo voltaic (PV) inverters, charging systems (e.g., electric vehicle (EV) charging stations) and similar applications providing electric power to electric devices.

SUMMARY

In particular, embodiments of the disclosure base on the following considerations made by the inventors:

Quasi operation of a multilevel flying capacitor topology is one alternative concept to realize an effective medium voltage (MV) switch to gain Cost, Density and Efficiency (CDE) benefit for high power MV converters. FIG. 1 shows an example of such a converter with a multilevel flying capacitor topology/structure. That is, the converter corresponds to a multilevel converter. A multilevel converter may be used to convert a voltage from AC to DC or vice versa with the implementation of intermediate voltage levels for better representation of the AC voltage. Key reason to use such a multilevel converter is to equally divide the maximum voltage between the switches with lower voltage class of the converter.

The converter of FIG. 1 may be operated as a two-level converter. That is, the switches of the converter may be controlled respectively switched such that the output terminal OUT1 of the converter 1 may provide an output voltage Vout variable between a first voltage level and a second voltage level. The first voltage level may correspond to the voltage level applied to a first input terminal IN1 of the converter 1 and the second voltage level may correspond to the voltage level applied to a second input terminal IN2 of the converter 1. The voltage Vin (may also be referred to as input voltage) applied to the input, in particular received by the first and second input terminal IN1 and IN2, of the converter 1 corresponds to the difference between the first voltage level and the second voltage level. In other words, the input voltage Vin received by the first and second input terminal corresponds to the voltage that is applied between the first and second input terminal IN1 and IN2 of the converter 1. In particular, the switches of the converter may be controlled such that at a first steady state of the converter 1 the output voltage Vout of the converter 1 equals to the first voltage level, and at a second steady state of the converter 1 the output voltage Vout equals to the second voltage level.

The output voltage Vout of the converter may potentially equal to more than two voltage levels, in particular to two additional voltage levels between the first voltage level and the second voltage level in the case of the converter structure shown in FIG. 1. Thus, operating the converter 1 of FIG. 1 as a two-level converter may also be referred to as operating the converter 1 as a quasi-two-level (Q2L) converter. The two additional voltage levels may in particular correspond to the voltage across the capacitor unit C1 and the voltage across the capacitor unit C2 of the converter 1. The two-level configuration allows using low voltage semiconductor devices, in particular low voltage semiconductor switches for the switches of the converter, to reduce the costs of the converter and to increase the effective operational voltage level.

One application example of the present disclosure may be, the electric energy generated from a solar PV plant is to be translated to a higher voltage for efficient transmission. Typically, these higher voltage levels may be 10 kV, 20 kV or 35 kV. The semiconductor devices, in particular semiconductor switches, in order to withstand such high level of the required voltage range are not available. Thus, different multilevel configurations based on low voltage devices, in particular low voltage switches, may be used to obtain the required voltage range. A flying capacitor topology, as exemplarily shown in FIG. 1, is one possible example of a multilevel configuration.

The flying capacitor configuration with typical multilevel operation requires large capacitor banks to store the power needed for intermediate voltage levels. Whereas quasi-two-level operation (that is operating a multi-level converter as a two-level converter) use a small amount of the capacitance during transitions (may also be referred to as transitions phases) between the first steady state and the second steady state of the converter. This significantly decreases the required size of the capacitor banks and increases the efficiency and power density (volumetric and weight).

The lifetime of the converter is dependent on the health state (also referred to as state of health) of each component of the converter. The switches (may also be referred to as switching devices) of the converter, in particular in the form of transistors and diodes, are the most vulnerable components due to the constant stress coming from the switching behaviour and internal resistance. This stress is caused by power losses generated while in operation and resulted in as a thermal heat and is measured in watts.

Due to non-ideal behaviour of the components these thermal stress is not equally distributed. As a result, after some time of exploitation, the health state of some transistors is significantly shortened than the health state of others.

In particular, the switches are not ideal and may have slightly different characteristics such as on-resistance, gate threshold voltage, turn-on/turn-off times and thermal impedance. Moreover, the thermal interface of a switch has microscopic imperfections which can trap air particles between the case and the heatsink. This degrades the thermal impedance between the switch and external heat sink. Due to these reasons, the thermal stress on the switches of the converter is not equally distributed among the switches of the converter. Therefore, after some time of constant operation, the health state of some switches is considerably lower than the health state of the other devices. The health state and, thus, life time of the converter depends on the component with the worst health state and, thus, worst/shortest life time. That is, as soon as the health state and, thus, life time of a single switch of the converter decreases the health state and, thus, life time of the converter correspondingly decreases.

In view of the above-mentioned problems and disadvantages, embodiments of the disclosure aim to improve the above describe problems. In particular, an objective is to provide a method for operating a converter that allows to increase the life time of a converter.

The objective is achieved by the embodiments of the disclosure as described in the enclosed independent claims. Advantageous implementations of the embodiments of the disclosure are further defined in the dependent claims. In particular, embodiments of the disclosure achieve the above objective by redistributing some of the stress, in particular thermal stress, from switches with low health state to switches with higher health state.

A first aspect of the present disclosure provides a method for operating a converter. The converter comprises a first and second input terminal for receiving a DC voltage, an output terminal for providing an output voltage variable between a first voltage level and a second voltage level, a first and second series connection of two or more switches that are semiconductor switches, and one or more capacitor units. The first input terminal is electrically connected via the first series connection of the two or more switches to the output terminal. The second input terminal is electrically connected via the second series connection of the two or more switches to the output terminal. Each of the one or more capacitor units electrically connects a first node between two switches of the first series connection and a second node between two switches of the second series connection with each other, wherein the number of nodes between the first node and the output terminal and the number of nodes between the second node and the output terminal are equal to each other. The DC voltage is equally distributable to the switches of the first and second series connection by controlling the switches such that each of the one or more capacitor units is charged to a respective third voltage level. The method comprises the following operation: compensating different power losses of the switches by controlling the switches such that one or more of the one or more capacitor units are charged above the respective third voltage level, and/or that one or more of the one or more capacitor units are charged below the respective third voltage level, so that the DC voltage is not equally distributed to the switches.

In other words, according to the method of the first aspect, the switches are controlled such that one or more of the one or more capacitor units are charged above the respective third voltage level and/or that one or more of the one or more capacitor units are charged below the respective third voltage level. As a result thereof, the DC voltage is not equally distributed to the switches, which allows compensating different power losses of the switches.

Therefore, the method allows redistributing some of the stress, in particular thermal stress, from switches with low health state to switches with higher health state. As a result, the method allows improving the life time of the converter, which depends on the switch with the worst health state and, thus, worst/shortes life time.

The terms "electrically connect" and "connect" may be used as synonyms.

The method may be a method for operating a multilevel converter. That is, the converter may be a multilevel converter. In particular, the method is a method for operating a multilevel converter as a two-level or three-level converter. The converter may be a DC/AC or DC/DC converter.

In particular, the one or more capacitor units are electrically connected to different first nodes and second nodes. That is, to each first node and second node only one capacitor unit of the one or more capacitor units is electrically connected.

In particular, the number of capacitor units is one less than the number of switches of the first series connection respectively second series connection.

The switches, being semiconductor switches, of the converter may be transistors, such as one or more insulated-gate bipolar transistors (IGBTs), one or more field-effect transistors (FETs), one or more metal-oxide-semiconductor field-effect transistors (MOSFETs), one or more bipolar junction transistors (BJTs) and/or one or more junction gate field-effect transistors (JFETs). The switches of the converter may be of the same transistor type or may correspond to at least two different transistor types. In particular, a diode may be electrically connected in anti-parallel to the switches, in particular in case of the switches being one or more IGBTs and/or MOSFETs. The diode may be an intrinsic body diode of a respective transistor. In particular, the switches are power switches.

Each capacitor unit may correspond to a capacitor. Alternatively, each capacitor unit may correspond to two capacitors electrically connected in series. In case each capacitor unit corresponds to two capacitors electrically connected in series, the converter may comprise a series connection of two capacitors electrically connecting the first input terminal and second input terminal of the converter with each other.

In one embodiment, the method comprises the following operation: compensating different power losses of the switches by controlling the switches such that one or more of the one or more capacitor units get charged above the respective third voltage level, and/or that one or more of the one or more capacitor units get charged or discharged below the respective third voltage level; in one embodiment, during one or more transition phases between a first steady state of the converter, at which the output voltage equals to the first voltage level, and a second steady state of the converter, at which the output voltage equals to the second voltage level. That is, this controlling of the switches may, in one embodiment, be performed/occur during one or more transition phases between the first steady state of the converter and the second steady state of the converter.

The output voltage may be variable between the first voltage level at the first steady state of the converter and the second voltage level at the second steady state of the converter.

The DC voltage may be equally distributable to the switches of the first and second series connection by controlling the switches such that, during the one or more transition phases between the first steady state and second steady state of the converter, each of the one or more capacitor units is charged to the respective third voltage level In one embodiment, the method comprises the following operation: determining the power loss of one or more of the switches by measuring the temperature of the respective switch as an indicator of the power loss of the respective switch. In particular, the method may comprise the following operation: determining the power loss of each of the switches by measuring the temperature of the respective switch as an indicator of the power loss of the respective switch.

In particular, the power loss of a switch is the switching power loss of the switch. That is, the power loss of a switch in particular refers to the switching power loss of the switch.

In particular, the higher the temperature of a switch the higher is the power loss of the switch. In particular, the higher the power loss of a switch, the higher is the stress on the switch and, thus, the worse is the health state of the switch.

In one embodiment, the method comprises the following operations: determining a switch with the highest power loss among the power losses of the switches; and controlling the switches such that a portion of the DC voltage distributed to the switch with the highest power loss is reduced.

By reducing the portion of the DC voltage distributed to the switch with the highest power loss, the switching power loss of said switch is reduced.

In one embodiment, the method comprises the following operation: controlling the switches such that the portion of the DC voltage distributed to the switch with the highest power loss is reduced and the rest of the DC voltage is equally distributed to the rest of the switches.

In one embodiment, the method comprises the following operation: determining a combined power loss of each switch pair comprising a first switch of the first series connection and a second switch of the second series connection, wherein the number of switches between the first switch and the output terminal and the number of switches between the second switch and the output terminal are equal to each other. In addition, the method may comprise the following operations: determining a switch pair with the highest combined power loss among the combined power losses of the switch pairs of the first and second series connection; and controlling the switches such that a portion of the DC voltage distributed to the first switch and second switch of the switch pair with the highest combined power loss is reduced.

By reducing the portion of the DC voltage distributed to the first switch and second switch of the switch pair with the highest combined power loss, the switching power loss of said first switch and second switch is reduced.

In one embodiment, the method comprises the following operation: controlling the switches such that the portion of the DC voltage distributed to the first switch and second switch of the switch pair with the highest combined power loss is reduced and the rest of the DC voltage is equally distributed to the rest of the switches.

In one embodiment, the method comprises the following operation: determining the combined power loss of one or more of the switch pairs by determining the sum of the temperature of the first switch of the respective switch pair and the temperature of the second switch of the respective switch pair as an indicator for the combined power loss of the respective switch pair. In particular, the method may comprise the following operation: determining the combined power loss of each of the switch pairs by determining the sum of the temperature of the first switch of the respective switch pair and the temperature of the second switch of the respective switch pair as an indicator for the combined power loss of the respective switch pair.

In particular, the higher the sum of the temperatures of the two switches of a switch pair the higher is the power loss of the switch pair. In particular, the higher the power loss of a switch pair, the higher is the stress on the switches of the switch pair and, thus, the worse is the health state of the switch pair.

In one embodiment, for reducing a portion of the DC voltage distributed to a switch that is electrically connected to the output terminal, the method comprises the following operation: controlling the switches such that a capacitor unit of the one or more capacitor units is charged below the respective third voltage level, wherein the capacitor unit is electrically connected to the first node of the first series connection and second node of the second series connection that are closest, in terms of the number of nodes, to the output terminal.

A switch that is electrically connected to the output terminal may be referred to as output switch or third switch. The capacitor unit, which is electrically connected to the first node of the first series connection and second node of the second series connection that are closest, in terms of the number of nodes, to the output terminal, may be referred to as output capacitor unit or third capacitor unit.

In particular, the less the capacitor unit (output capacitor unit) is charged below the respective third voltage level the more the portion of the DC voltage distributed to the switch (output switch) is reduced.

That is, the smaller/lower the voltage level, to which the capacitor unit (output capacitor unit) is charged, below the respective third voltage level the more the switching power loss of the switch (output switch) may be reduced.

In particular, for reducing the portion of the DC voltage distributed to the switch (output switch), the method comprises the following operation: controlling the switches such that the capacitor unit (output capacitor unit) of the one or more capacitor units gets charged or discharged below the respective third voltage level. In one embodiment, for reducing the portion of the DC voltage distributed to the switch (output switch), the method comprises the following operation: controlling the switches such that the capacitor unit (output capacitor unit) of the one or more capacitor units gets charged or discharged below the respective third voltage level during the one or more transition phases.

In particular, the less the capacitor unit (output capacitor unit) gets charged below the respective third voltage level the more the portion of the DC voltage distributed to the switch (output switch) is reduced. In particular, the more the capacitor unit (output capacitor unit) gets discharged below the respective third voltage level the more the portion of the DC voltage distributed to the switch (output switch) is reduced.

That is, the smaller/lower the voltage level, to which the capacitor unit (output capacitor unit) gets charged to, below the third voltage level the more the switching power loss of the switch (output switch) may be reduced. The smaller/lower the voltage level, to which the capacitor unit (output capacitor unit) gets discharged to, below the third voltage level the more the switching power loss of the switch (output switch) may be reduced.

In particular, the capacitor unit (output capacitor unit) may get charged in case the capacitor unit (output capacitor unit) is discharged, e.g., not already charged. In particular, the capacitor unit (output capacitor unit) may get discharged in case the capacitor unit (output capacitor unit) is already charged to the third voltage level or above the third voltage level.

In one embodiment, for reducing a portion of the DC voltage distributed to a switch that is electrically connected via one or more switches to the output terminal, the method comprises the following operation: controlling the switches such that a first capacitor unit of the one or more capacitor units is charged above the respective third voltage level, wherein the first capacitor unit is connected to a terminal of two terminals of the switch that is closer, in terms of the number of nodes, to the output terminal; and/or controlling the switches such that a second capacitor unit of the one or more capacitor units is charged below the respective third voltage level, wherein the second capacitor unit is connected to the other terminal of the two terminals of the switch.

A switch that is electrically connected via one or more switches to the output terminal may be referred to as fourth switch.

In particular, the more the first capacitor unit is charged above the respective third voltage level the more the portion of the DC voltage distributed to the switch (fourth switch) is reduced; and/or the less the second capacitor unit is charged below the respective third voltage level the more the portion of the DC voltage distributed to the switch (fourth switch) is reduced.

In particular, for reducing the portion of the DC voltage distributed to the switch (fourth switch), the method comprises the following operation: controlling the switches such that the first capacitor unit of the one or more capacitor units gets charged above the respective third voltage level, in one embodiment, during the one or more transition phases; and/or controlling the switches such that the second capacitor unit of the one or more capacitor units gets charged or discharged below the respective third voltage level, in one embodiment, during the one or more transition phases.

In other words, charging of the first capacitor unit of the one or more capacitor units above the respective third voltage level may, in one embodiment, be performed/occur during the one or more transition phases. The additionally or alternatively charging or discharging of the second capacitor unit of the one or more capacitor units below the respective third voltage level may, in one embodiment, be performed/occur during the one or more transition phases.

In particular, the more the first capacitor unit gets charged above the respective third voltage level, the more the portion of the DC voltage distributed to the switch (fourth switch) is reduced. In particular, the less the second capacitor unit gets charged below the respective third voltage level the more the portion of the DC voltage distributed to the switch (fourth switch) is reduced. In particular, the more the second capacitor unit gets discharged below the third voltage level the more the portion of the DC voltage distributed to the switch (fourth switch) is reduced.

In particular, the higher the number of nodes between the output terminal and the first node, to which a capacitor unit is connected to, the greater is the respective third voltage level of the capacitor unit.

In order to achieve the method according to the first aspect of the present disclosure, some or all of the implementation forms and optional features of the first aspect, as described above, may be combined with each other.

A second aspect of the present disclosure provides a control unit for a converter, wherein the control unit is configured to perform the method according to the first aspect, as described above, for controlling switches of the converter.

The control unit of the second aspect and its implementation forms and optional features achieve the same advantages as the method of the first aspect and its respective implementation forms and respective optional features.

The implementation forms and optional features of the method according to the first aspect are correspondingly valid for the control unit according to the second aspect.

In particular, the converter may be a multilevel converter. The above description of the converter operable by the method of the first aspect is correspondingly valid for the converter that is controllable by the control unit of the second aspect.

In particular, the converter controllable by the control unit comprises a first and second input terminal for receiving a DC voltage, an output terminal for providing an output voltage variable between a first voltage level and a second voltage level, a first and second series connection of two or more switches that are semiconductor switches, and one or more capacitor units. The first input terminal is electrically connected via the first series connection of the two or more switches to the output terminal. The second input terminal is electrically connected via the second series connection of the two or more switches to the output terminal. Each of the one or more capacitor units electrically connects a first node between two switches of the first series connection and a second node between two switches of the second series connection with each other, wherein the number of nodes between the first node and the output terminal and the number of nodes between the second node and the output terminal are equal to each other.

The control unit may comprise or correspond to a processor, microprocessor, controller, microcontroller, field programmable gate array (FPGA), application specific integrated circuit (ASIC) or any combination of the aforementioned components.

In particular, the control unit is configured to equally distribute the DC voltage to the switches of the first and second series connection by controlling the switches such that each of the one or more capacitor units is charged to a respective third voltage level. In other words, the control unit is in particular configured to control the switches such that each of the one or more capacitor units is charged to a respective third voltage level in order to equally distribute the DC voltage to the switches of the first and second series connection of the converter.

In particular, the control unit is configured to control the switches such that one or more of the one or more capacitor units are charged above the respective third voltage level, and/or that one or more of the one or more capacitor units are charged below the respective third voltage level, so that the DC voltage is not equally distributed to the switches, in order to compensate different power losses of the switches.

In one embodiment, the control unit is configured to control the switches such that one or more of the one or more capacitor units get charged above the respective third voltage level, and/or that one or more of the one or more capacitor units get charged or discharged below the respective third voltage level, in order to compensate different power losses of the switches. The control unit may be configured to perform this controlling of the switches during one or more transition phases between a first steady state of the converter, at which the output voltage equals to the first voltage level, and a second steady state of the converter, at which the output voltage equals to the second voltage level.

In one embodiment, the control unit is configured to determine the power loss of one or more of the switches by measuring the temperature of the respective switch as an indicator of the power loss of the respective switch. In particular, the control unit may be configured to determine the power loss of each of the switches by measuring the temperature of the respective switch as an indicator of the power loss of the respective switch.

In one embodiment, the control unit is configured to determine a switch with the highest power loss among the power losses of the switches; and to control the switches such that a portion of the DC voltage distributed to the switch with the highest power loss is reduced.

In one embodiment, the control unit is configured to control the switches such that the portion of the DC voltage distributed to the switch with the highest power is reduced and the rest of the DC voltage is equally distributed to the rest of the switches.

In one embodiment, the control unit is configured to determine a combined power loss of each switch pair comprising a first switch of the first series connection and a second switch of the second series connection, wherein the number of switches between the first switch and the output terminal and the number of switches between the second switch and the output terminal are equal to each other. Further, the control unit may be configured to determine a switch pair with the highest combined power loss among the combined power losses of the switch pairs of the first and second series connection; and to control the switches such that a portion of the DC voltage distributed to the first switch and second switch of the switch pair with the highest combined power loss is reduced.

In one embodiment, the control unit is configured to control the switches such that the portion of the DC voltage distributed to the first switch and second switch of the switch pair with the highest combined power loss is reduced and the rest of the DC voltage is equally distributed to the rest of the switches.

In one embodiment, the control unit is configured to determine the combined power loss of one or more of the switch pairs by determining the sum of the temperature of the first switch of the respective switch pair and the temperature of the second switch of the respective switch pair as an indicator for the combined power loss of the respective switch pair. In particular, the control unit may be configured to determine the combined power loss of each of the switch pairs by determining the sum of the temperature of the first switch of the respective switch pair and the temperature of the second switch of the respective switch pair as an indicator for the combined power loss of the respective switch pair.

In one embodiment, for reducing a portion of the DC voltage distributed to a switch that is electrically connected to the output terminal, the control unit is configured to control the switches such that a capacitor unit of the one or more capacitor units is charged below the respective third voltage level, wherein the capacitor unit is electrically connected to the first node of the first series connection and second node of the second series connection that is closest, in terms of the number of nodes, to the output terminal.

In one embodiment, for reducing a portion of the DC voltage distributed to a switch that is electrically connected via one or more switches to the output terminal, the control unit is configured to control the switches such that a first capacitor unit of the one or more capacitor units is charged above the respective third voltage level, wherein the first capacitor unit is connected to a terminal of two terminals of the switch that is closer, in terms of the number of nodes, to the output terminal. In addition or alternatively, the control unit may be configured to control the switches such that a second capacitor unit of the one or more capacitor units is charged below the respective third voltage level, wherein the second capacitor unit is connected to the other terminal of the two terminals of the switch.

In order to achieve the control unit according to the second aspect of the present disclosure, some or all of the implementation forms and optional features of the second aspect, as described above, may be combined with each other.

A third aspect of the present disclosure provides a converter. The converter comprises a first and second input terminal for receiving a DC voltage, an output terminal for providing an output voltage that is variable between a first voltage level and a second voltage level, a first and second series connection of two or more switches that are semiconductor switches, one or more capacitor units, and a control unit for controlling the switches. The first input terminal is electrically connected via the first series connection of the two or more switches to the output terminal. The second input terminal is electrically connected via the second series connection of the two or more switches to the output terminal. Each of the one or more capacitor units electrically connects a first node between two switches of the first series connection and a second node between two switches of the second series connection with each other, wherein the number of nodes between the first node and the output terminal and the number of nodes between the second node and the output terminal are equal to each other. The control unit is configured to equally distribute the DC voltage to the switches of the first and second series connection by controlling the switches such that each of the one or more capacitor units is charged to a respective third voltage level. The control unit is configured to compensate different power losses of the switches by controlling the switches such that one or more of the one or more capacitor units are charged above the respective third voltage level, and/or that one or more of the one or more capacitor units are charged below the respective third voltage level, so that the DC voltage is not equally distributed to the switches.

In other words, the control unit is configured to control the switches such that each of the one or more capacitor units is charged to a respective third voltage level in order to equally distribute the DC voltage to the switches of the first and second series connection of the converter. Further, the control unit is configured to control the switches such that one or more of the one or more capacitor units are charged above the respective third voltage level, and/or that one or more of the one or more capacitor units are charged below the respective third voltage level, so that the DC voltage is not equally distributed to the switches, in order to compensate different power losses of the switches.

The converter of the third aspect and its implementation forms and optional features achieve the same advantages as the method of the first aspect and its respective implementation forms and respective optional features.

The implementation forms and optional features of the method according to the first aspect are correspondingly valid for the converter according to the third aspect, in particular for the control unit of the converter according to the third aspect. In particular, the above description with regard to a converter operable by the method of the first aspect and a converter controllable by the control unit of the second aspect is correspondingly valid for the converter according to the third aspect.

In particular, the converter may be a multilevel converter. The converter may be a DC/AC or DC/DC converter. The control unit of the converter according to the third aspect may be a control unit according to the second aspect, as described above. The above description of the control unit of the second aspect may be correspondingly valid for the control unit of the converter of the third aspect.

The control unit may comprise or correspond to a processor, microprocessor, controller, microcontroller, field programmable gate array (FPGA), application specific integrated circuit (ASIC) or any combination of the aforementioned components.

In one embodiment, each capacitor unit corresponds to a capacitor or to two capacitors electrically connected in series. In case each capacitor unit corresponds to two capacitors electrically connected in series, the converter may comprise a series connection of two capacitors electrically connecting the first input terminal and second input terminal of the converter with each other.

In order to achieve the converter according to the third aspect of the present disclosure, some or all of the implementation forms and optional features of the third aspect, as described above, may be combined with each other.

A fourth aspect of the present disclosure provides a computer program comprising a program code for performing the method according to the first aspect or any of its implementation forms, as described above. In particular, a computer program comprising program code for performing when implemented on a computer, the method according to the first aspect or any of its implementation forms, may be provided by the disclosure.

A fifth aspect of the present disclosure provides a computer comprising a memory and a processor, which are configured to store and execute program code to perform the method according to the first aspect or any of its implementation forms.

A sixth aspect of the present disclosure provides a non-transitory storage medium storing executable program code which, when executed by a control unit (e.g., computer), causes the method according to the first aspect or any of its implementation forms, as described above, to be performed.

The computer program of the fourth aspect, the computer according to the fifth aspect and the non-transitory storage medium according to the sixth aspect achieve the same advantages as the method of the first aspect and its respective implementation forms and respective optional features.

It has to be noted that all devices, elements, units and means described in the present application could be implemented in software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which

FIG. 3a shows voltage curves over time for upper switches $S_{U1}$, $S_{U2}$ and $S_{U3}$ of the converter presented in FIG. 1, and FIG. 3b shows a voltage curve over time for the output voltage of the converter presented in FIG. 1.

In the Figures corresponding elements are labeled with the same reference sign.

DETAILED DESCRIPTION OF EMBODIMENTS

Figure 1:
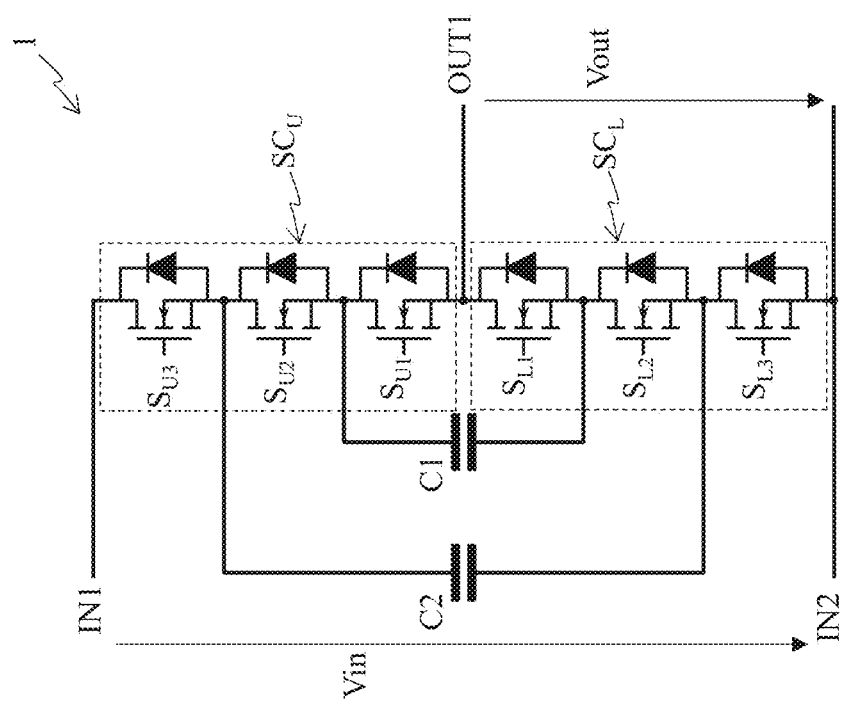
FIG. 1 shows an example of a structure of a converter according to an embodiment of the disclosure.

FIG. 1 shows an example of a structure of a converter according to an embodiment of the disclosure.

The above description of the converter according to the third aspect is correspondingly valid for the converter 1 of FIG. 1. For operating the converter 1 of FIG. 1 according to the method of the first aspect, reference is made to the above description of the method of the first aspect.

The converter 1 of FIG. 1 may be implemented as described above with respect to the converter of the third aspect and as shown in FIG. 1. That is, the converter 1 comprises a first input terminal IN1 and second input terminal IN2 for receiving a DC voltage Vin and an output terminal OUT1 for providing an output voltage Vout that is variable between a first voltage level and a second voltage level.

The converter 1 further comprises a first series connection $SC_U$ of three switches $S_{U3}$, $S_{U2}$, $S_{U1}$ that are semiconductor switches and a second series connection $SC_L$ of three switches $S_{L1}$, $S_{L2}$, $S_{L3}$ that are semiconductor switches. The number of switches of each of the first series connection $SC_U$ and second series connection $SC_L$ shown in FIG. 1 is only by way of example and may be only two switches or more than two switches. As shown in FIG. 1, the switches $S_{U3}$, $S_{U2}$, $S_{U1}$, $S_{L1}$, $S_{L2}$, $S_{L3}$ of the converter 1 are MOSFETs with a diode connected in antiparallel to each MOSFET. This is only by way of example and, thus, the switches may correspond to different semiconductor switches, in particular transistors. As indicated in FIG. 1, the number of switches of the first series connection $SC_U$ equals to the number of switches of the second series connection $SC_L$.

The converter 1 further comprises two capacitor units C1 and C2. This is only by way of example and, thus, the number of capacitor units of the converter 1 may be only one capacitor unit or more than two capacitor units. In particular, the number of capacitor units is one less than the number of switches of the first series connection $SC_U$ respectively second series connection $SC_L$. Each capacitor unit C1, C2 comprises or corresponds to a capacitor as shown in FIG. 1. The capacitor may in one embodiment be implemented by one or more capacitor elements electrically connected in series and/or in parallel. Furthermore, the converter 1 comprises a control unit (in FIG. 1 not shown, exemplarily shown in FIG. 4a) for controlling the switches of the converter 1.

As shown in FIG. 1, the first input terminal IN1 is electrically connected via the first series connection $SC_U$, in particular the three switches $S_{U3}$, $S_{U2}$, $S_{U1}$ of the first series connection $SC_U$, to the output terminal OUT1. The second input terminal IN2 is electrically connected via the second series connection $SC_L$, in particular the three switches $S_{L1}$, $S_{L2}$, $S_{L3}$ of the second series connection $SC_L$, to the output terminal OUT1. Each of the two capacitor units C1, C2 electrically connects a first node between two switches of the first series connection $SC_U$ and a second node between two switches of the second series connection $SC_L$ with each other, wherein the number of nodes between the first node and the output terminal OUT1 and the number of nodes between the second node and the output terminal OUT2 are equal to each other. For example, as shown in FIG. 1, the capacitor unit C1 connects the node (may be referred to as first node) between the switches $S_{U2}$ and $S_{U1}$ of the first series connection $SC_U$ and the node (may be referred to as second node) between the switches $S_{L1}$ and $S_{L2}$ of the second series connection $SC_L$ with each other. The number of nodes between the output terminal OUT1 and the node between the switches $S_{U2}$ and $S_{U1}$ equals to the number of nodes between the output terminal OUT1 and the node between the switches $S_{L1}$ and $S_{L2}$. Namely, this number is equal to zero nodes.

The control unit is configured to equally distribute the DC voltage Vin to the switches $S_{U3}$, $S_{U2}$, $S_{U1}$, $S_{L1}$, $S_{L2}$, $S_{L3}$ of the first and second series connection $SC_U$ and $SC_L$ by controlling the switches $S_{U3}$, $S_{U2}$, $S_{U1}$, $S_{L1}$, $S_{L2}$, $S_{L3}$ such that each of the capacitor units C1, C2 is charged to a respective third voltage level. The control unit is configured to compensate different power losses of the switches $S_{U3}$, $S_{U2}$, $S_{U1}$, $S_{L1}$, $S_{L2}$, $S_{L3}$ by controlling the switches $S_{U3}$, $S_{U2}$, $S_{U1}$, $S_{L1}$, $S_{L2}$, $S_{L3}$ such that one or more of the capacitor units C1, C2 are charged above the respective third voltage level, and/or that one or more of the capacitor units C1, C2 are charged below the respective third voltage level, so that the DC voltage Vin is not equally distributed to the switches $S_{U3}$, $S_{U2}$, $S_{U1}$, $S_{L1}$, $S_{L2}$, $S_{L3}$. The control unit is in particular configured to perform the method of the first aspect, as described above, for controlling the switching of the switches $S_{U3}$, $S_{U2}$, $S_{U1}$, $S_{L1}$, $S_{L2}$, $S_{L3}$ of the converter 1.

In the converter of FIG. 1 a switch (first switch) of the first series connection $SC_U$ and a switch (second switch) of the second series connection $SC_L$ form a switch pair, when the number of switches between the switch of the first series connection $SC_U$ and the output terminal OUT1 equals to the number of switches between the switch of the second series connection $SC_L$ and the output terminals. Therefore, the switches $S_{U1}$ and $S_{L1}$, the switches $S_{U2}$ and $S_{L2}$ and the switches $S_{U3}$ and $S_{L3}$ each form a switch pair. When controlling the switches of the converter 1, the switches of each switch pair may be inversely controlled. That is, when a switch of a switch pair is in the conducting state then the other switch of the switch pair may be in the non-conducting state and vice versa.

Figure 4:
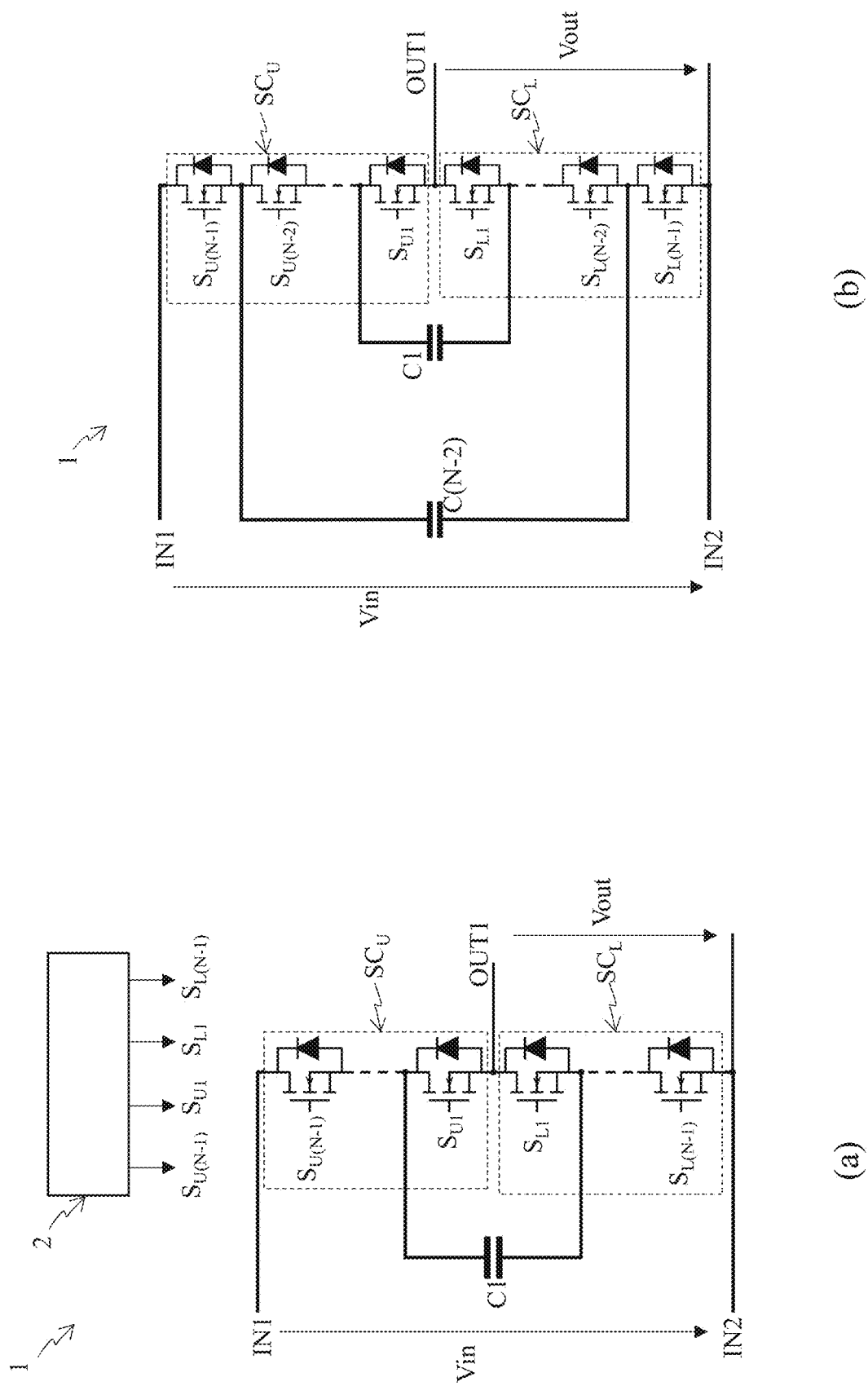
FIGS. 4 and 5 each show two examples of a structure of a converter according to an embodiment of the disclosure.
Figure 5:
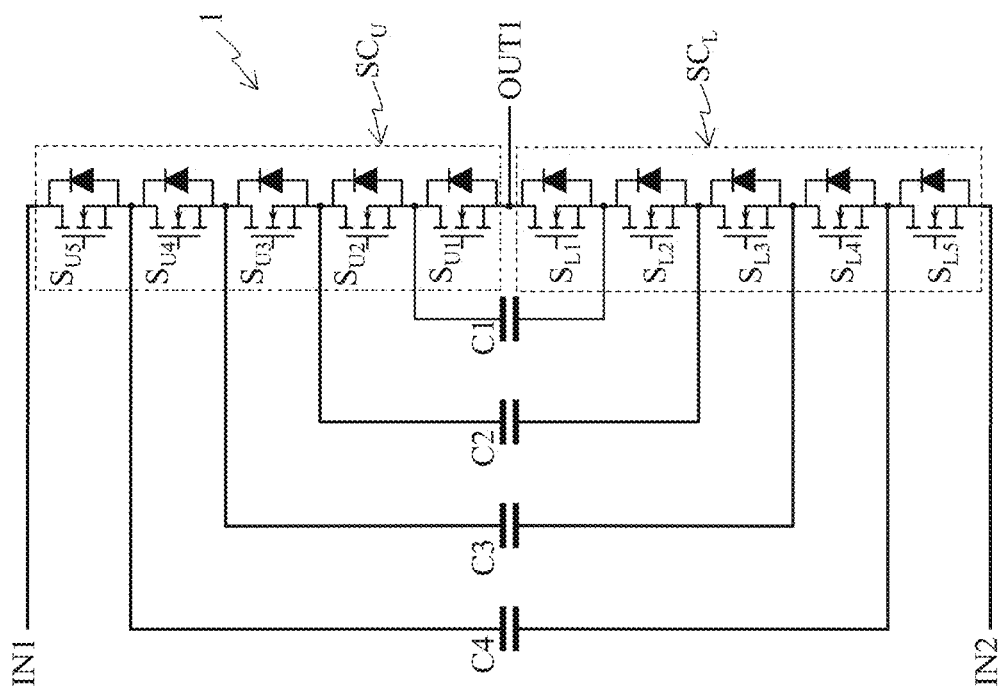
Figure 5:
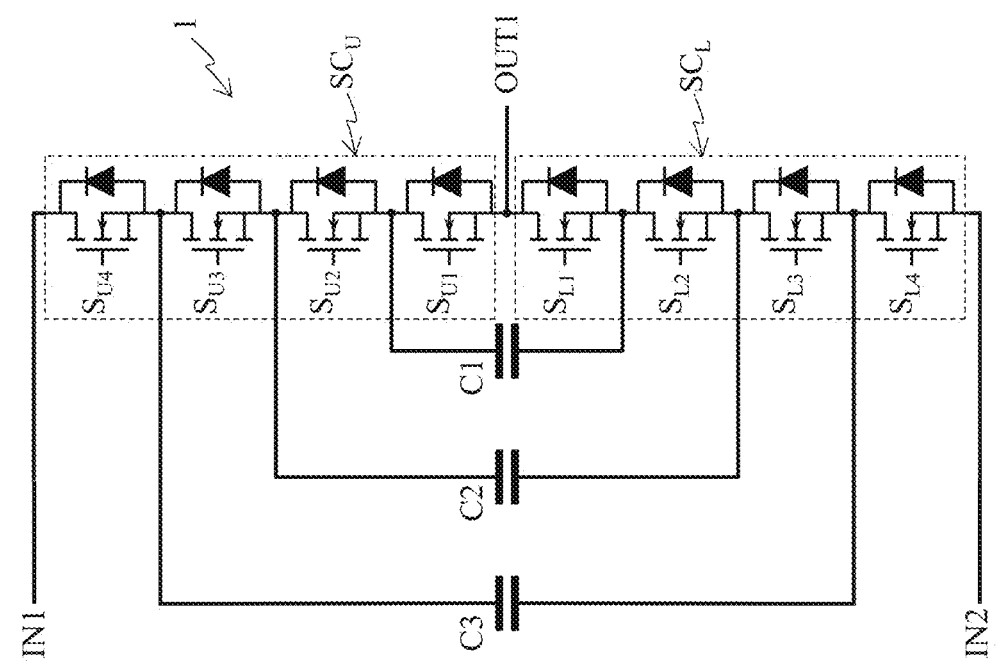

Before describing examples of operation of the converter according to embodiments of the disclosure, reference is made to the FIGS. 4 and 5 with regard to the fact that the number of switches and capacitor units of the converter 1 is not limited to the number shown in FIG. 1, as already outlined above.

FIGS. 4 and 5 each show two examples of a structure of a converter according to an embodiment of the disclosure. The converter structures of FIGS. 4 and 5 correspond to the converter structure of FIG. 1 only differing in the number of switches and capacitor units of the converter. Therefore, the description with regard to the converter of FIG. 1 is correspondingly valid for the converters of FIGS. 4 and 5.

The first series connection $SC_U$ and second series connection $SC_L$ of switches of the converter 1 of FIG. 4a each comprise two or more switches $S_{U(N-1)}$, ..., $S_{U1}$ respectively $S_{L(N-1)}$, ..., $S_{L1}$. The converter 1 of FIG. 4a comprises at least one capacitor unit C1. In FIG. 4a, the control unit 2 of the converter for controlling the switches $S_{U(N-1)}$, ..., $S_{U1}$, ..., $S_{L1}$ of the converter 1 is exemplarily shown. As indicated by arrows, the control unit 2 is configured to control each of the switches $S_{U(N-1)}$, ..., $S_{U1}$, ..., $S_{L1}$ of the two series connections of switches $SC_U$ and $SC_L$.

The first series connection $SC_U$ and second series connection $SC_L$ of switches of the converter 1 of FIG. 4b each comprise three or more switches $S_{U(N-1)}$, ..., $S_{U1}$ respectively $S_{L(N-1)}$, $S_{L(N-2)}$, ..., $S_{L1}$. The converter 1 of FIG. 4b comprises at least two capacitor units C(N-2) and C1.

Thus, according to FIG. 4 the number of switches of each series connection of switches $SC_U$ and $SC_L$ corresponds to N-1 (that is the number of switches of the converter corresponds to 2*(N-1)) and the number of capacitor units corresponds to N-2, wherein N is an integer greater or equal to three (N>3). As can be seen from FIGS. 4 (a) and (b), the number of capacitor units (N-2) is one less than the number of switches (N-1) of the first series connection $SC_U$ respectively second series connection $SC_L$. Depending on the number of switches of each series connection $SC_U$, $SC_L$ respectively capacitor units the converter may be referred to as N-stage converter, in particular as N-stage two-level converter or N-stage quasi-two-level (Q2L) converter. That is, in case of each series connection $SC_U$ and $SC_L$ of the converter comprising two switches, the converter may be referred to as three-stage (3-stage) converter. In the case of each series connection $SC_U$ and $SC_L$ of the converter comprising three switches, the converter may be referred to as four-stage (4-stage) converter and so on.

The first series connection $SC_U$ and second series connection $SC_L$ of switches of the converter 1 of FIG. 5a each comprise four switches $S_{U4}$, $S_{U3}$, $S_{U2}$, $S_{U1}$ respectively $S_{L4}$, $S_{L3}$, $S_{L2}$, $S_{L1}$. The converter 1 of FIG. 5a comprises three capacitor units C1, C2 and C3. Thus, the converter 1 of FIG. 5a may be referred to as five-stage (5-stage) converter. The first series connection $SC_U$ and second series connection $SC_L$ of switches of the converter 1 of FIG. 5b each comprise five switches $S_{U5}$, $S_{U4}$, $S_{U3}$, $S_{U2}$, $S_{U1}$ respectively $S_{L5}$, $S_{L4}$, $S_{L3}$, $S_{L2}$, $S_{L1}$. The converter 1 of FIG. 5b comprises four capacitor units C1, C2, C3 and C4. Thus, the converter 1 of FIG. 5b may be referred to as six-stage (6-stage) converter. The number of switches and capacitors units is not limited and may be further increased based on the device voltage class and the required effective voltage. That is, the higher the number of switches the lower may be the voltage class of the switches for a respective voltage Vin applied to the input IN1', IN2 of the converter.

FIGS. 10, 11, 12 and 13 show a further converter structure, which may be referred to as nested T-type converter. The nested T-type converter structure basically corresponds to the converter structure shown in FIGS. 1, 4 and 5, with the difference that in the case of the nested T-type converter structure, each capacitor unit corresponds to two capacitors electrically connected in series. One or both of the two capacitors may in one embodiment be implemented by one or more capacitor elements electrically connected in series and/or in parallel. Furthermore, the converter of FIGS. 10, 11, 12 and 13 comprise a series connection SC of two capacitors Ca and Cb electrically connecting the first input terminal IN1 and second input terminal IN2 of the converter 1 with each other. The above description of the FIGS. 1, 4 and 5 is correspondingly valid for the converters of FIGS. 10, 11, 12 and 13.

Figure 10:
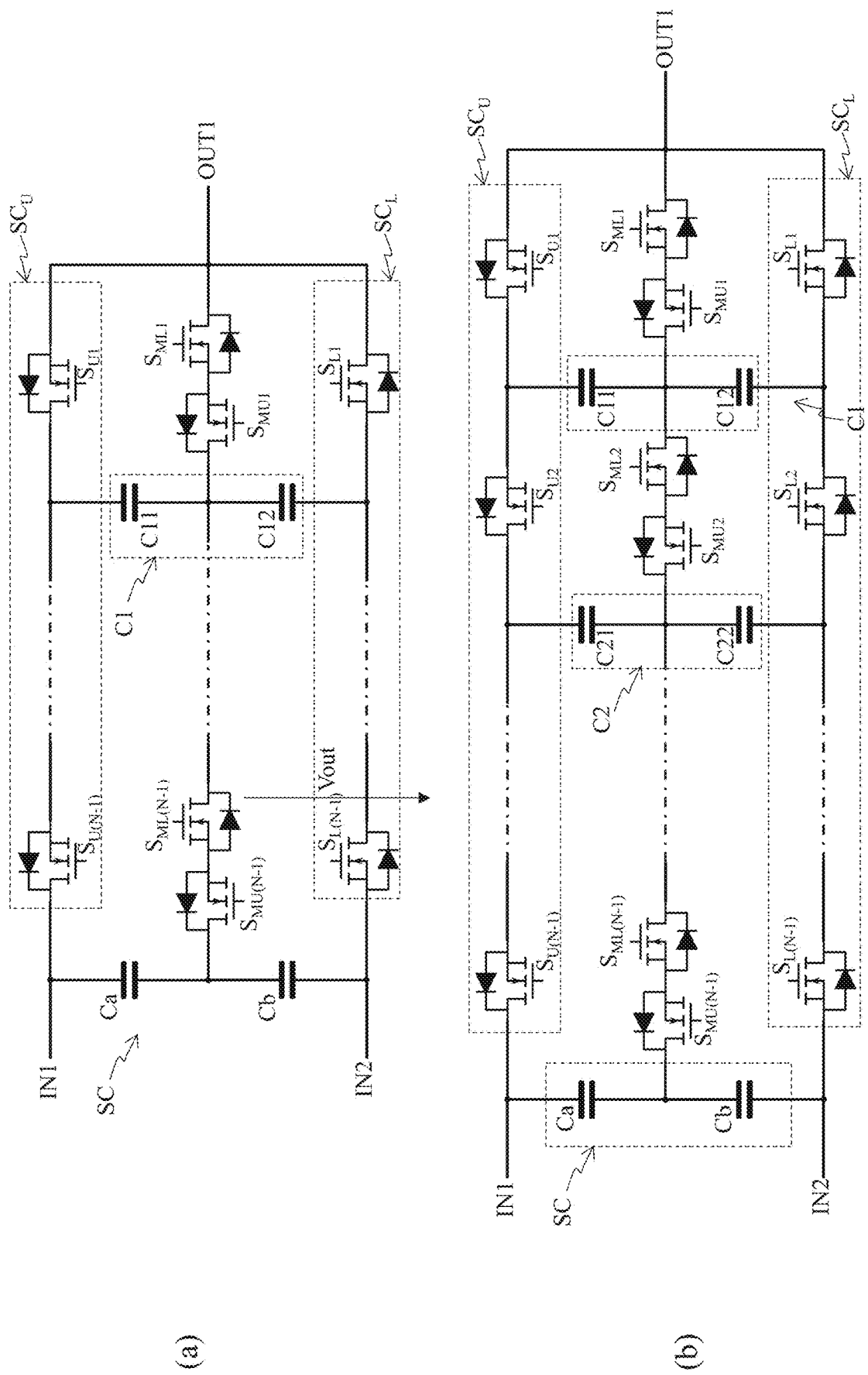
FIG. 10 shows two examples of a structure of a converter according to an embodiment of the disclosure.

FIG. 10 shows two example of a structure of a converter according to an embodiment of the disclosure. FIG. 10 (*a*) shows a nested T-type converter structure that corresponds to the converter structure of FIG. 4*a*. Thus, reference is made to the above description of FIG. 4*a* for describing the converter of FIG. 10*a* and in the following, only the differences are described. The at least one capacitor unit C1 corresponds to two capacitors C11 and C12 electrically connected in series. In addition, as shown in FIG. 10*a* the node between the two capacitors Ca and Cb of the series connection SC, the node between the two capacitors C11 and C12 of the at least one capacitor unit C1 and the output terminal OUT1 may be connected to each other by at least two bi-directional switches. Each bi-directional switch may comprise two transistors $S_{MU(N-1)}$, $S_{ML(N-1)}$ respectively $S_{MU1}$, $S_{ML1}$ with, in one embodiment, a diode connected in antiparallel to each transistor. The bidirectional switches may also be implemented differently, in particular using one or more different transistor types.

FIG. 10 (*b*) shows a nested T-type converter structure that corresponds to the converter structure of FIG. 4*b*. Thus, reference is made to the above description of FIG. 4*b* for describing the converter of FIG. 10*b* and in the following, only the differences are described. The at least two capacitor units C1 and C2 each correspond to two capacitors C11, C12 respectively C21, C22 electrically connected in series. In addition, as shown in FIG. 10*b* the node between the two capacitors Ca and Cb of the series connection SC, the node between the two capacitors C21 and C22 of the capacitor unit C2, the node between the two capacitors C11 and C12 of the capacitor unit C1 and the output terminal OUT1 may be connected to each other by at least three bi-directional switches. Each bi-directional switch may comprise two transistors $S_{MU(N-1)}$, $S_{ML(N-1)}$ respectively $S_{MU2}$, $S_{ML2}$ respectively $S_{MU1}$, $S_{ML1}$ with, in one embodiment, a diode connected in antiparallel to each transistor. The bidirectional switches may also be implemented differently, in particular using one or more different transistor types.

Thus, according to FIG. 10 the number of switches of each series connection of switches $SC_U$ and $SC_L$ corresponds to N−1 and the number of optional bidirectional switches connecting the nodes between two capacitors and the output terminal OUT1 corresponds to N−1, wherein N is an integer greater or equal to three (N>3). Depending on the number of switches of each series connection $SC_U$, $SC_L$ the converter may be referred to as (2*N+1)-level nested T-type converter ((2*N+1)-L-NTT converter). That is, in case of each series connection $SC_U$ and $SC_L$ of the converter comprising two switches, the converter may be referred to as five-level (5-level) nested T-type converter. In the case of each series connection $SC_U$ and $SC_L$ of the converter comprising three switches, the converter may be referred to as seven-level (7-level) nested T-type converter and so on.

The nested T-type converters of FIG. 10 may be operated as a three-level converter. That is, the switches of the respective converter may be controlled respectively switched such that the output terminal OUT1 of the converter 1 may provide an output voltage Vout variable between a first voltage level, a second voltage level and a third voltage level. The first voltage level may correspond to the voltage level applied to the first input terminal IN1 of the converter 1 and the second voltage level may correspond to the voltage level applied to the second input terminal IN2 of the converter 1. The third voltage level may correspond to the voltage level at the node between the two capacitors Ca, Cb electrically connected in series between the first input terminal IN1 and the second input terminal IN2.

Figure 11:
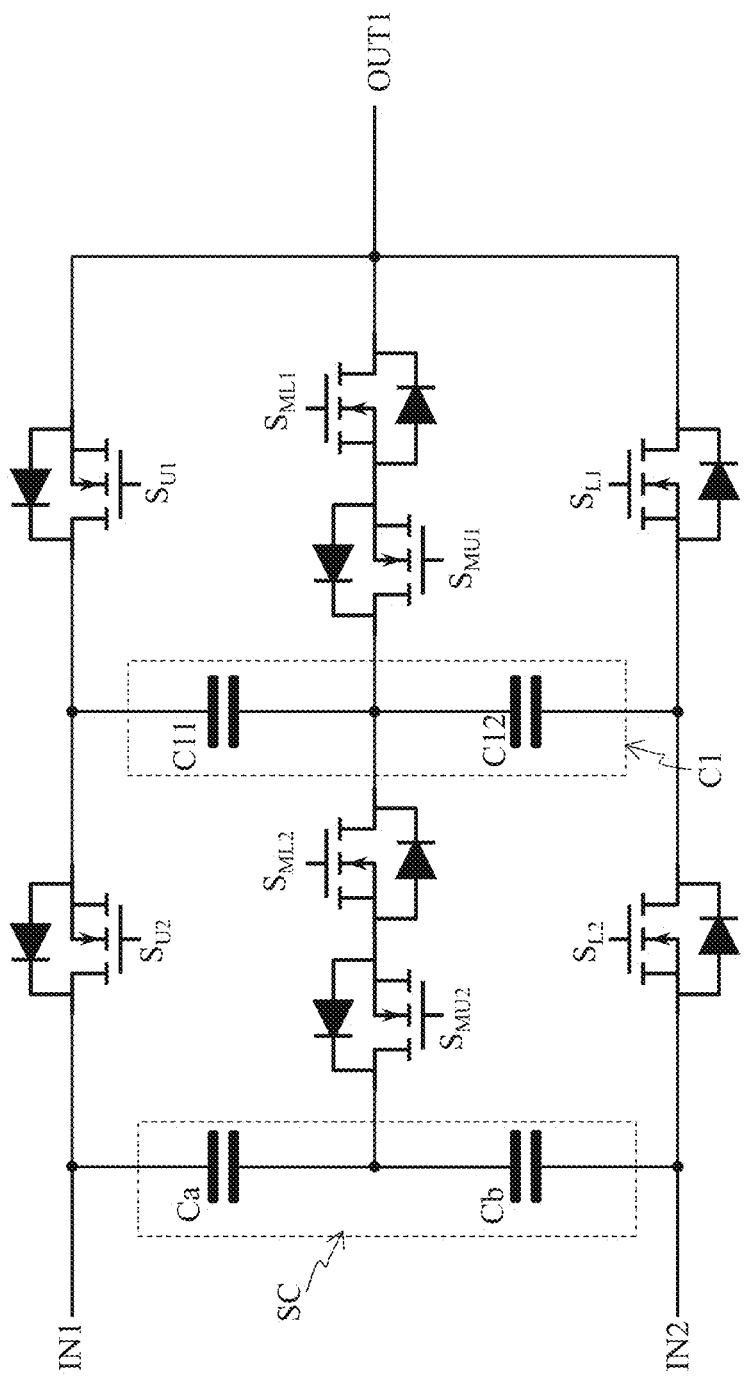
FIGS. 11, 12 and 13 each show an example of a structure of a converter according to an embodiment of the disclosure.
Figure 12:
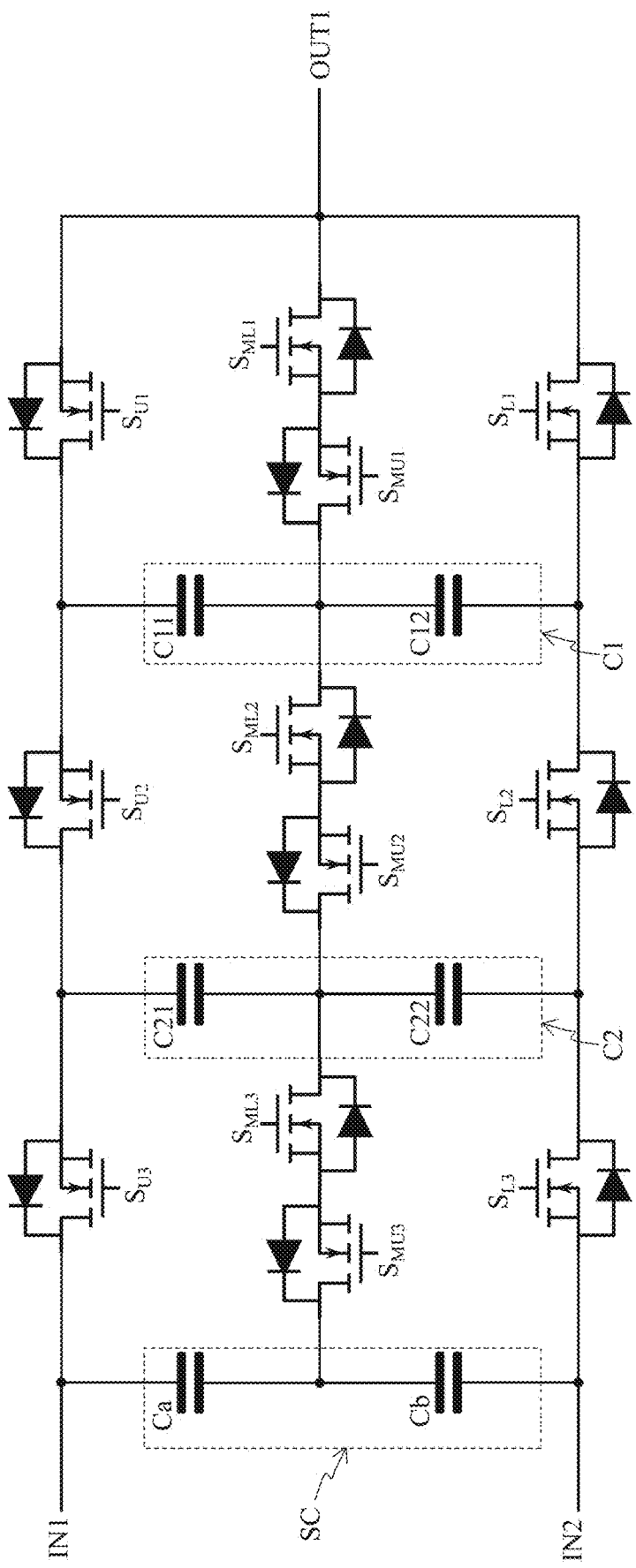
Figure 13:
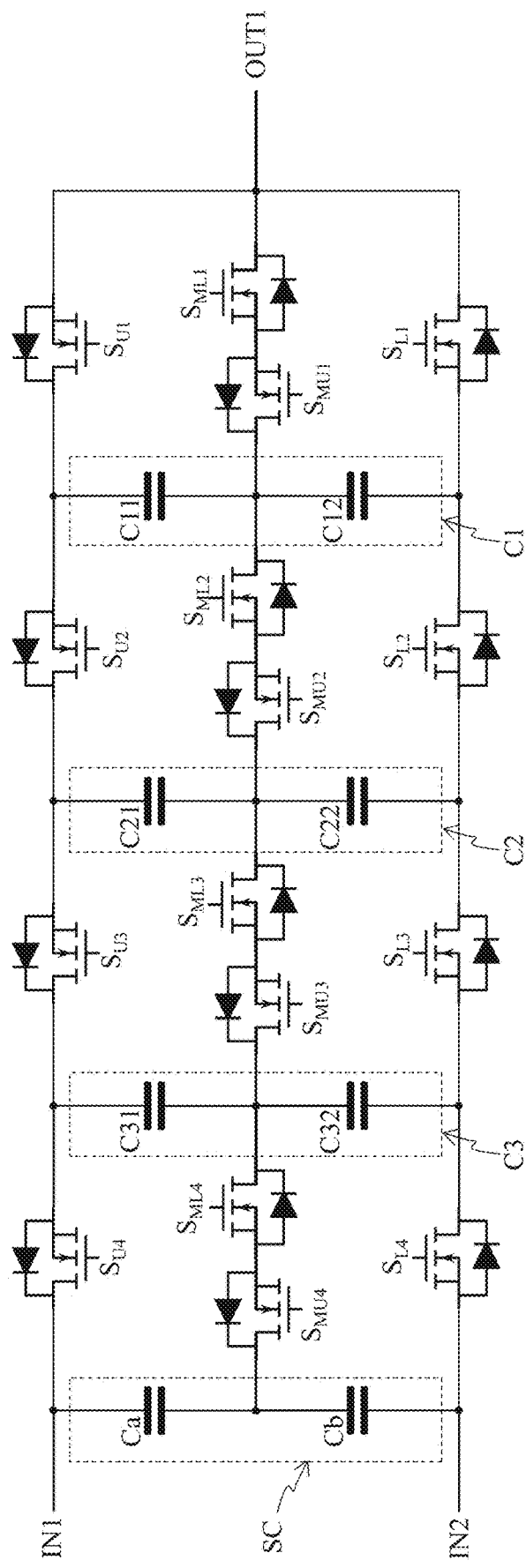

FIGS. 11, 12 and 13 each show an example of a structure of a converter according to an embodiment of the disclosure. The above description with respect to FIG. 10 is correspondingly valid for describing the converters of FIGS. 11, 12 and 13. The first series connection $SC_U$ and second series connection $SC_L$ of switches of the converter 1 of FIG. 11 each comprise two switches $S_{U2}$, $S_{U1}$ respectively $S_{L2}$, $S_{L1}$. The converter 1 of FIG. 11 comprises one capacitor unit C1 corresponding to two capacitors C11 and C12 connected in series, and two bidirectional switches $S_{MU2}$, $S_{ML2}$ and $S_{MU1}$, $S_{ML1}$. Thus, the converter 1 of FIG. 11 may be referred to as five-level (5-level) nested T-type converter.

The nested T-type converter of FIG. 12 corresponds to the converter of FIG. 1 with regard to the number of switches of the two series connections $SC_U$ and $SC_L$ and the number of capacitor units. The two capacitor units C1 and C2 each correspond to two capacitors C11, C12 respectively C21. C22 connected in series. The converter 1 of FIG. 12 comprises three bidirectional switches $S_{MU3}$, $S_{ML3}$; $S_{MU2}$, $S_{ML2}$; $S_{MU1}$, $S_{ML1}$. The converter 1 of FIG. 12 may be referred to as seven-level (7-level) nested T-type converter. The nested T-type converter of FIG. 13 corresponds to the converter of FIG. 5*a* with regard to the number of switches of the two series connections $SC_U$ and $SC_L$ and the number of capacitor units. The three capacitor units C1, C2 and C3 each correspond to two capacitors C11, C12 respectively C21, C22 respectively C31, C32 connected in series. The converter 1 of FIG. 13 comprises four bidirectional switches $S_{MU4}$, $S_{ML4}$; $S_{MU3}$, $S_{ML3}$; $S_{MU2}$, $S_{ML2}$; $S_{MU1}$, $S_{ML1}$. The converter 1 of FIG. 12 may be referred to as nine-level (9-level) nested T-type converter.

In the following, an operation of the converter of FIG. 1 according to examples of the method of the present disclosure are described with respect to the FIGS. 2, 3, 6, 7 and 8. This description is also valid for converters with the converter structure shown in FIG. 1 but a different number of switches and capacitor units compared to the number of switches and capacitor units shown in FIG. 1 as well as for converters with a nested T-type converter structure. That is, the following description is correspondingly valid for the converters of FIGS. 4, 5, 10, 11, 12 and 13. In other words, the method of the present disclosure may be used for operating converters comprising a converter structure exemplarily shown in FIGS. 1, 4 and 5 as well as for operating nested T-type converters exemplarily shown in FIGS. 10, 11, 12 and 13 irrespective of the number of switches of the two series connections of switches $SC_U$, $SC_L$ and number of capacitor units of the respective converter.

For the following description, it is assumed that a first voltage level $V_{IN1}$ is applied to the first input terminal IN1 and a second voltage level $V_{IN2}$ is applied to the second input terminal IN2, wherein the first voltage level $V_{IN1}$ is greater than the second voltage level $V_{IN2}$ ($V_{IN1} > V_{IN2}$). Thus, the DC voltage Vin applied to the input of the converter, in particular between the two input terminals IN1 and IN2, may correspond to the difference between these two voltage levels (Vin=$V_{IN1}-V_{IN2}$). Further, it is assumed that the second voltage level $V_{IN2}$ corresponds to ground ($V_{IN2}$=GND), in particular to zero Volts ($V_{IN2}$=0 V). The following is correspondingly valid in case that the second voltage level $V_{IN2}$ corresponds to a voltage level different than ground GND or zero Volts. According to an embodiment the first voltage level $V_{IN1}$ may equal to a positive DC voltage level and the second voltage level $V_{IN2}$ may equal to a negative DC voltage level. The following description is correspondingly valid in case an AC voltage is applied to the input, in particular between the two input terminals IN1 and IN2, of the converter 1.

In a normal operation of the converter 1 of FIG. 1 the DC voltage Vin may be equally distributed across switches of either one of the two series connections $SC_U$ and $SC_L$ of the converter. For example, the steady state (second steady state) of the converter 1 at which the output voltage Vout corresponds to the second voltage level $V_{IN2}$ may be achieved by controlling the switches of the converter 1 such that the switches $S_{L1}$, $S_{L2}$ and $S_{L3}$ of the second series connection $SC_L$ are in the conducting state and the switches $S_{U1}$, $S_{U2}$ and $S_{U3}$ of the first series connection $SC_U$ are in the non-conducting state. The terms "being on", "being in the on-state" and "being in the conducting state" may be used as synonyms. The terms "being off", "being in the off-state" and "being in the non-conducting state" may be used as synonyms. In this case of steady state (second steady state), in a normal operation, the DC voltage Vin is equally distributed across the non-conducting switches $S_{U1}$, $S_{U2}$ and $S_{U3}$ of the first series connection $SC_U$. That is, the voltage $V_{SU1}$ across the switch $S_{U1}$, the voltage $V_{SU2}$ across the switch $S_{U2}$ and the voltage $V_{SU3}$ across the switch $S_{U3}$ equal to each other in the aforementioned steady state.

Figure 2:
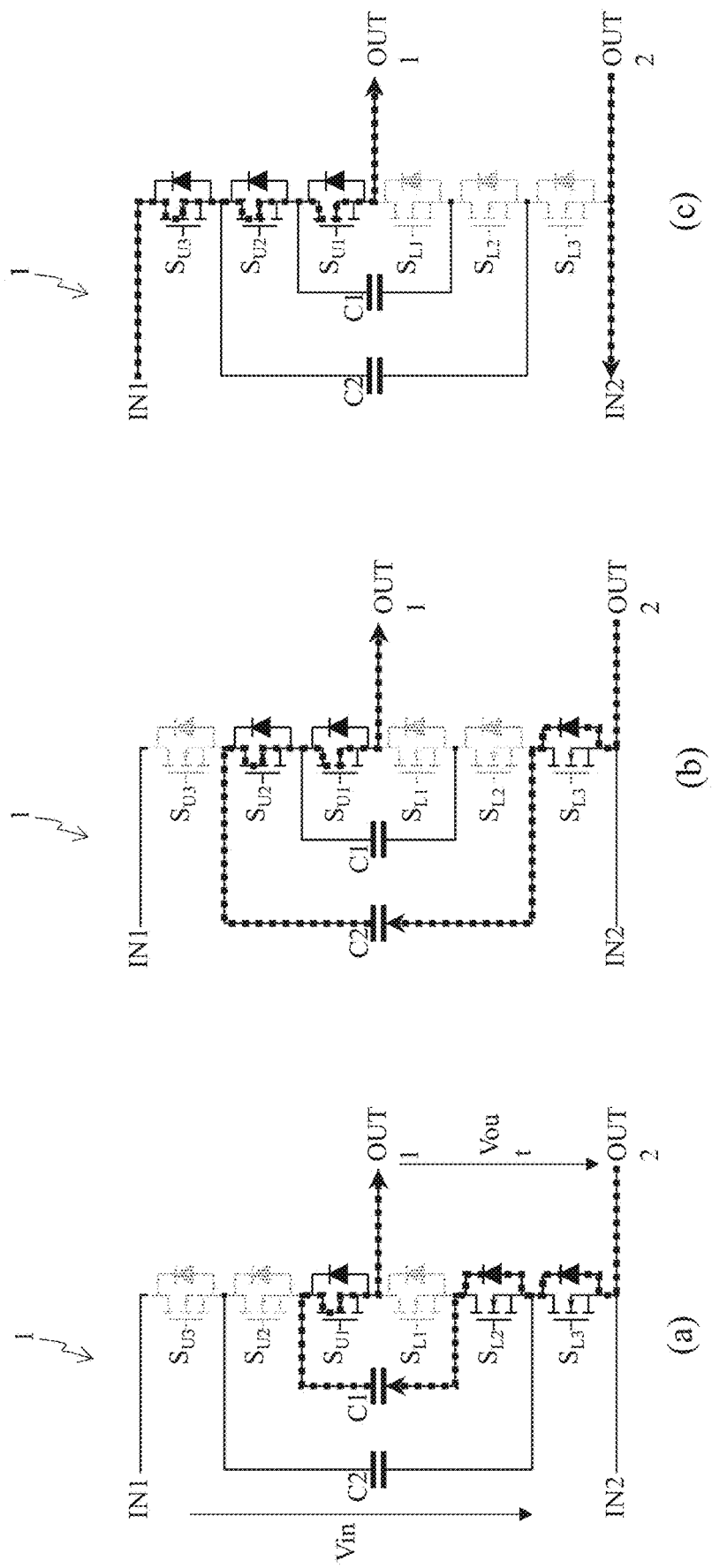
FIG. 2 shows three different switching states of the converter of FIG. 1, when operating the converter of FIG. 1 according to an example of the method according to an embodiment of the disclosure.

For switching between the first steady state of the converter, at which the output voltage Vout equals to the first voltage level $V_{IN1}$, and the second steady state of the converter, at which the output voltage Vout equals to the second voltage level $V_{IN2}$, the converter 1 of FIG. 1 may be operated according to a two-level (2-level) converter with short time intervals forming quasi multilevel stages. These short time intervals may also be referred to as transition phases. The key reason to use this kind of operation method switching between the two steady states of the converter via short transition phases is to be able to use small voltage class devices (switches) in series connection to obtain higher voltage levels. Due to the small operations and slower voltage slew rates the requirements for the isolation design and electromagnetic interference suppression are much lower and the volume and weight of the capacitor units are more compact. FIG. 2 shows the switching states of the converter during two transition phases and the first steady state of the converter.

FIG. 2 shows three different switching states of the converter of FIG. 1, when operating the converter of FIG. 1 according to an example of the method according to an embodiment of the disclosure. In FIG. 2 the current flow through the converter is shown as a bold dotted line. As shown in FIG. 2, the converter 1 of FIG. 1 may, in one embodiment, comprise a further output terminal OUT2 that is connected to the second input terminal IN2 of the converter 1

In particular, FIGS. 2a and 2b show the state of the converter during the two transition phases when switching the converter between the second steady state and the first steady state, wherein FIG. 2c shows the first steady state. As a starting state, the converter 1 may be in the second steady state of the converter 1 (not shown in FIG. 2), in which the switches $S_{L1}$, $S_{L2}$ and $S_{L3}$ of the second series connection $SC_L$ are in the conducting state and the switches $S_{U1}$, $S_{U2}$ and $S_{U3}$ of the first series connection $SC_U$ are in the non-conducting state. For switching the converter 1 to the first steady state, at first the switch $S_{L1}$ of the second series connection $SC_L$ is switched to the non-conducting state and the switch $S_{U1}$ of the first series connection $SC_U$ is switched to the conducting-state. The current flows from the capacitor unit C1 to the output terminal OUT1 and the output voltage Vout equals to the voltage $V_{C1}$ of the capacitor C1. The switching state of the converter during this short transition phase is shown in FIG. 2a. This transition phase may last approximately 1 microsecond. Thus, after a very short time interval (e.g., approximately 1 microsecond) the switch $S_{L2}$ of the second series connection $SC_L$ is switched to the non-conducting state and the switch $S_{U2}$ of the first series connection $SC_U$ is switched to the conducting-state. As a result the current flow from the capacitor C1 stops, a current starts flowing from capacitor C2 to the output terminal OUT1 and the output voltage Vout equals to the voltage $V_{C2}$ of the capacitor C2. The switching state of the converter during this short transition phase is shown in FIG. 2b. This transition phase may also last approximately 1 microsecond. Thus, after an equal amount of very short time (e.g., approximately 1 microsecond) the switch $S_{L3}$ of the second series connection $SC_L$ is switched to the non-conducting state and the switch $S_{U3}$ of the first series connection $SC_U$ is switched to the conducting-state. As a result, there is now current flow from the capacitors C1 and C2. Namely, a current flows from the first input terminal IN1 via the conducting switches $S_{U3}$, $S_{U2}$ and $S_{U1}$ of the first series connection $SC_L$ to the output terminal OUT1. Thus, the output voltage Vout equals to the first voltage level $V_{IN1}$ applied to the first input terminal IN1. This state corresponds to the first steady state and is shown in FIG. 2c. For switching the converter from the first steady state to the second steady state the above description may be correspondingly valid, wherein now the switches that had been switched to the non-conducting state may be switched to the conducting state and vice versa. The sequence starting with the state of FIG. 2c, may be followed by the transition phase shown in FIG. 2b, followed by the transition phase shown in FIG. 2a and finally followed by the second steady state of the converter not shown in FIG. 2.

The delay interval between switching the switches of a series connection $SC_U$ or $SC_L$ to the conducting-state or the non-conducting state (that is switching at least two switches of a series connection $SC_U$ or $SC_L$ not at the same time but after each other) is done to establish the intermediate voltage levels $V_{C1}$ and $V_{C2}$ with no overloading of the device voltage rate. The intermediate voltage levels $V_{C1}$ and $V_{C2}$ are created by the capacitor units C1, C2 of the converter 1, which are directly interconnected with the switches, as shown in FIG. 1. For maintaining the required voltage levels across the capacitor units the switches of the converter may be switched accordingly as exemplarily described with respect to FIG. 6. Namely, a capacitor unit may be charged to increase the voltage of the capacitor unit by correspondingly switching the switches of the converter. Accordingly, a capacitor unit may be discharged to decrease the voltage of the capacitor unit by correspondingly switching the switches of the converter.

Figure 3:
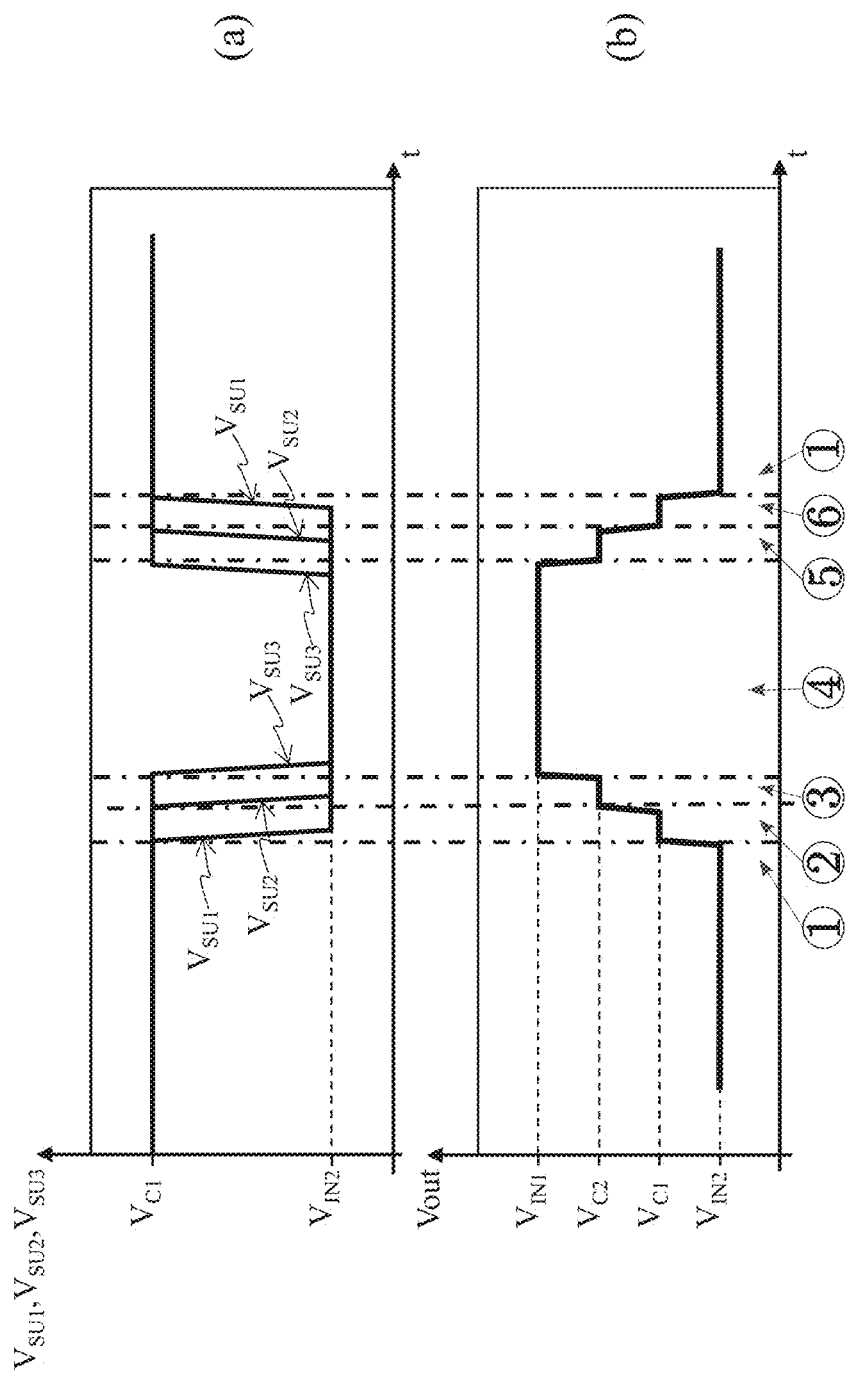
FIG. 3 shows voltage curves over time present in the converter of FIG. 1, when operating the converter of FIG. 1 according to an example of the method according to an embodiment of the disclosure. In particular.

FIG. 3 shows voltage curves over time present in the converter of FIG. 1, when operating the converter of FIG. 1 according to an example of the method according to an embodiment of the disclosure. In particular, when switching the converter of FIG. 1 from the second steady state to the first steady state and again back to the second steady state, FIG. 3a shows the voltage $V_{SU1}$ across the switch $S_{U1}$, the voltage $V_{SU2}$ across the switch $S_{U2}$ and the voltage $V_{SU3}$ across the switch $S_{U3}$ over time and FIG. 3b shows the output voltage Vout of the converter. The region 1 of FIG. 3 correspond to the second steady state of the converter. The region 4 of FIG. 3 corresponds to the first steady state of the converter, which is shown in FIG. 2c. The regions 2 and 3 of FIG. 3 correspond to very short transition phases respectively transition states (e.g., of approximately 1 microsecond), when switching from the second steady state to the first steady state and the regions 5 and 6 of FIG. 3 correspond to very short transition phases respectively transition states (e.g., of approximately 1 microsecond), when switching from the first steady state to the second steady state. The regions 2 and 6 of FIG. 3 correspond to the state of the converter shown in FIG. 2a and the regions 3 and 5 of FIG. 3 correspond to the state of the converter shown in FIG. 2b. As shown in FIG. 3, the voltage Vin applied to the input of the converter is equally distributed among the switches $S_{U1}$, $S_{U2}$ and $S_{U3}$ and is not higher than the voltage $V_{C1}$ of the capacitor unit C1.

The power losses of each switch of the converter consist of conduction losses and switching losses. The conduction losses depend on the switch current and on-resistance which is internal characteristic of the switch. The switching losses are dependent on the switch current, the voltage across the switch, the on-time/off-time and the switching frequency:

$$P_{sw} = P_{swOn} + P_{swOff} = V*I*t_{on}*f_{sw}V*I*t_{off}*f_{sw} \quad (1)$$

In the above equation $P_{sw}$ denotes the switching losses of a switch, $P_{swOn}$ denotes the losses when switching the switch to the conducting state, $P_{swOff}$ denotes the losses when switching the switch to the non-conducting state, V denotes the voltage across the switch, I denotes the switch current, $t_{on}$ denotes the on-time (time needed for switching the switch to the conducting-state), $t_{off}$ denotes the off-time (time needed for switching the switch to the non-conducting-state) and $f_{sw}$ denotes the switching frequency.

Real switches are not ideal and their characteristics such as on-resistance, gate threshold voltage, turn-on/turn-off times and thermal impedance are different. Furthermore, the thermal interface of a switch has microscopic imperfections which can trap air particles between the case and the heatsink. This degrades the thermal impedance between the switch and external heat sink. Due to these reasons, the stress on switches induced as power losses is not distributed equally among switches that are electrically connected in series. Therefore, after some time of constant operation, the health state of some switches may be considerably lower than the health state of the other switches. The failure of a single device may cause failure of the whole converter.

Therefore, the present disclosure proposes to actively change the voltage distribution of the voltage Vin received by the input terminals IN1 and IN2 among the switches $S_{U1}$, $S_{U2}$, $S_{U3}$ of the first series connection $SC_U$ respectively among the switches $S_{L1}$, $S_{L2}$, $S_{L3}$ of the second series connection $SC_L$, such that lower voltage is applied to one or more switches with lower/worse health states and more voltage is applied to the other switches with a higher/better health state. In other words, it is proposed to share the stress of the device of lower/worse health state with the devices with higher/better health state.

For equally distributing the voltage Vin receivable by the two input terminals IN1 and IN2, the switches of the converter are controlled such that each of the two capacitor units C1, C2 is charged to a respective third voltage level. The third voltage level of a capacitor unit $C_K$ may be defined as $(K*Vin)/(N_C+1)$, where Vin is the voltage received by the two input terminals IN1 and IN2, $N_C$ is the number of capacitor units in the converter and K is the index of the capacitor unit (wherein the index is greater or equal to one, K≥1). The capacitor unit connected closest to the output terminal has the lowest index K (K=1). Thus, in the case of the converter of FIG. 1, the third voltage level for the capacitor unit C1 may equal to Vin/3 and the third voltage level for the capacitor unit C2 may equal to 2Vin/3.

For a nested T-type converter, as exemplarily shown in FIGS. 10, 11, 12 and 13, the third voltage level of a capacitor unit $C_K$ may be defined as $(2*K*Vin)/(2*N_c)$, wherein Vin is the voltage received by the two input terminals IN1 and IN2 and K is the index of the capacitor unit (wherein the index is greater or equal to one, K≥1). $N_C$ is the number of capacitor units in the converter, wherein the series connection of the two capacitors Ca, Cb electrically connecting the first and second input terminal of the converter is counted as one capacitor unit. The capacitor unit connected closest to the output terminal has the lowest index K (K=1) and the series connection of the two capacitors Ca, Cb electrically connecting the first and second input terminal of the converter to each other is treated as the capacitor unit with the highest index K. Thus, with regard to the nested T-type converter of FIG. 11, the third voltage level for the capacitor unit C1 may equal to 2Vin/4, which is equally distributed among the capacitors C11 and C12 of the capacitor unit C1 (C11=C12=Vin/4). That is, the third voltage level for each capacitor of a capacitor unit corresponds to half of the third voltage level for the capacitor unit. The third voltage level for the series connection of the two capacitors Ca and Cb, which is treated as the capacitor unit C2, may equal to Vin, which is equally distributed among the capacitors Ca and Cb (Ca=Cb=Vin/2). With regard to FIG. 12, the third voltage level for the capacitor units may be as follows: C1=2Vin/6, C11=C12=Vin/6; C2=4Vin/6, C21=C22=2Vin/6; Ca=Cb=3Vin/6. With regard to FIG. 13, the third voltage level for the capacitor units may be as follows: C1=2Vin/8, C11=C12=Vin/8; C2=4Vin/8, C21=C22=2Vin/8; C3=6Vin/8, C31=C32=3Vin/8; Ca=Cb=4Vin/8.

With regard to FIG. 1, if the capacitor unit C2 gets charged to a higher/greater voltage level than the third voltage level for the capacitor unit C2, the voltage across the switches $S_{U3}$ and $S_{L3}$ will decrease, whereas the voltages across the switches $S_{U2}$ and $S_{L2}$ will increase, and vice versa. That is, the stress applied to the switches $S_{U3}$ and $S_{L3}$ may be reduced and redistributed to the remaining switches $S_{U2}$, $S_{U1}$, $S_{L1}$ and $S_{L2}$. If the capacitor unit C2 gets charged or discharged to a lower/smaller voltage level than the third voltage level for the capacitor unit C2, the voltage across the switches $S_{U3}$ and $S_{L3}$ will increase, whereas the voltages across the switches $S_{U2}$ and $S_{L2}$ will decrease. The terms "decrease" and "reduce" may be used as synonyms. The terms "increase" and "raise" may be used as synonyms.

In other words, the more the capacitor unit C2 gets charged above the respective/corresponding third voltage level, the more the portion of the voltage Vin distributed to the switches $S_{U3}$ and $S_{L3}$ is reduced and the more the portion of the voltage Vin distributed to the switches $S_{U2}$ and $S_{L2}$ is increased. Accordingly, the less the capacitor unit C2 gets charged below the respective/corresponding third voltage level or the more the capacitor unit C2 gets discharged below the respective/corresponding third voltage level, the more the portion of the voltage Vin distributed to the switches $S_{U3}$ and $S_{L3}$ is increased and the more the portion of the voltage Vin distributed to the switches $S_{U2}$ and $S_{L2}$ is reduced.

Then, the voltage of the capacitor unit C1 will determine the voltage distribution of the voltage of the capacitor unit C2 and, thus, the stress distribution between switches $S_{U2}$, $S_{L2}$ and switches $S_{U1}$, $S_{L1}$. If the capacitor unit C1 gets charged to the respective third voltage level for the capacitor unit C1, the voltage of the capacitor unit C2 and, thus, the remaining stress respectively power losses will be distributed equally between the remaining switch pairs $S_{U2}$, $S_{L2}$ and $S_{U1}$, $S_{L1}$. Otherwise, if the capacitor unit C1 gets charged to a higher/greater voltage level than the third voltage level for the capacitor unit C1, the voltage across the switches $S_{U2}$ and $S_{L2}$ will decrease, whereas the voltages across the switches $S_{U1}$ and $S_{L1}$ will increase, and vice versa. That is, the power losses of the switches $S_{U2}$ and $S_{L2}$ will be lower than the power losses of the switches $S_{U1}$ and $S_{L1}$. The above description is an example of how redistributing the voltages across the switches of the converter by charging and/or discharging the capacitor units C1 and C2 of the converter may redistribute the stress from weak switches to healthy switches. This will increase the lifetime of the whole converter.

The above description of the method of the first aspect is valid for describing a method of operating the converter of FIG. 1 to achieve a higher lifetime of the converter. With regard thereto, the switches $S_{U1}$ and $S_{L1}$ of the converter of FIG. 1 each correspond to a switch that is electrically connected to the output terminal OUT1 (may be referred to as output switch or third switch). The capacitor unit C1 corresponds to the capacitor unit that is electrically connected to the first node of the first series connection and second node of the second series connection that are closest, in terms of the number of nodes, to the output terminal. The switches $S_{U3}$, $S_{U2}$, $S_{L2}$ and $S_{L3}$ of the converter of FIG. 1 each correspond to a switch that is electrically connected via one or more switches to the output terminal OUT1. For the switches $S_{U3}$ and $S_{L3}$, the capacitor unit C2 corresponds to a first capacitor unit that is connected to a terminal of two terminals of the switch $S_{U3}$ respectively $S_{L3}$ that is closer, in terms of the number of nodes, to the output terminal OUT1. For the switches $S_{U2}$ and $S_{L2}$, the capacitor unit C1 corresponds to a first capacitor unit that is connected to a terminal of two terminals of the switch $S_{U2}$ respectively $S_{L2}$ that is closer, in terms of the number of nodes, to the output terminal OUT1. Moreover, for the switches $S_{U2}$ and $S_{L2}$, the capacitor unit C2 corresponds to a second capacitor unit that is connected to the other terminal of the two terminals of the switch $S_{U2}$ respectively $S_{L2}$.

Figure 6:
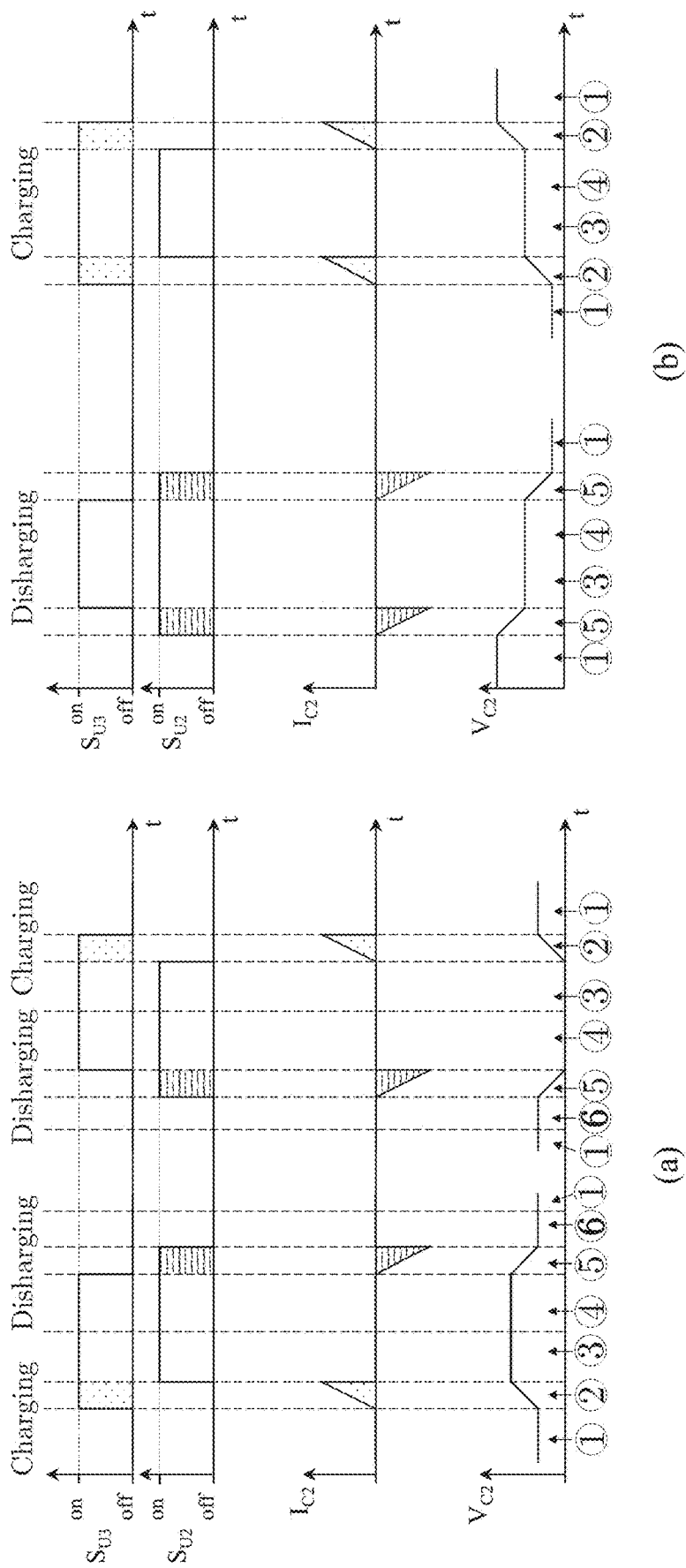
FIG. 6 shows voltage curves over time of voltages present in the converter of FIG. 1, when operating the converter of FIG. 1 according to an example of the method according to an embodiment of the disclosure.

FIG. 6 shows voltage curves over time of voltages present in the converter of FIG. 1, when operating the converter of FIG. 1 according to an example of the method according to an embodiment of the disclosure. In particular, FIG. 6 exemplarily shows switching sequences of the switches $S_{U2}$ and $S_{U3}$ of the first series connection $SC_U$ of the converter 1 of FIG. 1 for charging/discharging the capacitor unit C2 to change the voltage of the capacitor unit C2.

In FIG. 6, the top graphs show the switching of the switch $S_{U3}$ between the conducting-state "on" and the non-conducting state "off" over time t. The second-to-top graphs show the switching of the switch $S_{U2}$ between the conducting-state "on" and the non-conducting state "off" over time t. The second-to-bottom graphs show the current Ice through the capacitor unit C2 over time t and the bottom graphs show the voltage $V_{C2}$ of the capacitor unit C2 over time t.

The left graphs of FIG. 6a show a mixed sequence for a balanced operation, that is the capacitor unit C2 gets charged and discharged allowing the voltage of the capacitor unit C2 to stay constant when repeating this sequence, for example at the respective third voltage level. The right graphs of FIG. 6a show a further mixed sequence for a balanced operation, that is the capacitor unit C2 gets discharged and charged allowing the voltage of the capacitor unit C2 to stay constant when repeating this sequence, for example at the respective third voltage level.

The right graphs of FIG. 6b show a charging sequence, that is the capacitor unit C2 gets charged allowing to increase the voltage of the capacitor unit C2, for example above the respective third voltage level. In other words, the right graphs of FIG. 6b show a charging sequence for charging the capacitor unit C2 above for example the respective third voltage level. The left graphs of FIG. 6b show a discharging sequence, that is the capacitor unit C2 gets discharged allowing to decrease the voltage of the capacitor unit C2, for example below the respective third voltage level. In other words, the left graphs of FIG. 6b show a discharging sequence for discharging the capacitor unit C2 below for example the respective third voltage level. The description of FIG. 6 with respect to charging respectively discharging the capacitor unit C2 is correspondingly valid for charging and discharging another capacitor unit of the converter (capacitor unit C1).

The voltage levels of the capacitor units C1 and C2 of the converter of FIG. 1 may be changed during the transition phases between the first steady state and the second steady state of the converter. That is, the voltage levels of the capacitor units C1 and C2 may be changed according to the delay sequence between the switches of the converter. Namely, for switching the converter between the first steady state and the second steady state the switches $S_{U3}$, $S_{U2}$ and $S_{U1}$ of the first series connection $SC_U$ may be switched after each other with very short switching delays between the switching. This is also true for the switches $S_{L3}$, $S_{L2}$ and $S_{L1}$ of the second series connection $SC_L$. In the following switching of the switches $S_{U3}$, $S_{U2}$ and $S_{U1}$ of the first series connection $SC_U$ is described with respect to FIG. 6. The switches $S_{L3}$, $S_{L2}$ and $S_{L1}$ of the second series connection $SC_L$ are inversely switched. That is, the switch $S_{L3}$ and the switch $S_{U3}$ are inversely switched. For example, when the switch $S_{U3}$ is switched to the conducting state then the switch $S_{L3}$ is switched to the non-conducting state and vice versa. The same applies to the switch pair $S_{U2}$ and $S_{L2}$ and the switch pair $S_{U1}$ and $S_{L1}$. The passages "switching a switch to the conducting state/non-conducting state" and "turning a switch on/off" may be used as synonyms.

With regard to the switching sequence on the left side of FIG. 6a, the region 1 corresponds to the state of the converter in which the switches $S_{U3}$, $S_{U2}$ and $S_{U1}$ of the first series connection $SC_U$ are in the non-conducting state and, thus, all switches $S_{L3}$, $S_{L2}$ and $S_{U1}$ of the second series connection $SC_L$ are in the conducting state. Therefore, current flows from the output OUT1 to the second input terminal IN2, as shown in FIG. 7a. This corresponds to the second steady state of the converter. After that, as shown in region 2 of the left side of FIG. 6a, the switch $S_{U3}$ is switched to the conducting state while the switches $S_{U2}$ and $S_{U1}$ are in the non-conducting state. As a result, the capacitor unit C2 gets charged with the current Ice as is shown in region 2 of the left side of FIG. 6a and FIG. 7b. The amount of voltage added to/subtracted from a capacitor unit is proportional to the device current and operation time and inversely proportional to its capacitance as $\Delta v = i\Delta t/C$. The operation time may be very short, and the capacitance may be very small, therefore the voltage change may be limited and the switches (switching devices) are operated in save voltage range. Next, as shown in region 3 of the left side of FIG. 6a, the switch $S_{U2}$ is switched to the conducting state, while the switch $S_{U3}$ is in the conducting state and the switch $S_{U1}$ is in the non-conducting state. Thus, the current does not flow through the capacitor unit C2, but flows through the capacitor unit C1 so that the capacitor unit C1 gets charged as is shown in FIG. 7c corresponding to region 3 of FIG. 6. Next, in the region 4, the switch $S_{U1}$ is switched to the conducting state so that all the switches $S_{U3}$, $S_{U2}$ and $S_{U1}$ are in the conducting state. Therefore, the currents and voltages of the capacitor units C1, C2 do not change anymore. This corresponds to the first steady state as shown in FIG. 8a corresponding to region 4 of FIG. 6.

The switching sequence shown on the right side of FIG. 6a is opposite to the switching sequence shown on the left side of FIG. 6a. Namely, according to the sequence of regions 1, 2, 3, 4, 5, 6, 1 of the left side of FIG. 6a the capacitor units C1 and C2 get charged when switching the switches $S_{U3}$, $S_{U2}$ and $S_{U1}$ of the first series connection SCU from the non-conducting state to the conducting state by the sequence of regions 1, 2, 3, 4 (e.g., when switching the converter from the second steady state to the first steady state). In addition, the capacitor units C1 and C2 get discharged when switching the switches $S_{U3}$, $S_{U2}$ and $S_{U1}$ of the first series connection $SC_U$ from the conducting state to the non-conducting state by the sequence of regions 4, 5, 6, 1 (e.g., when switching the converter from the first steady state to the second steady state).

In contrast thereto, according to the sequence of regions 1, 6, 5, 4, 3, 2, 1 of the right side of FIG. 6a the capacitor units C1 and C2 get discharged when switching the switches $S_{U3}$, $S_{U2}$ and $S_{U1}$ of the first series connection $SC_U$ from the non-conducting state to the conducting state by the sequence of regions 1, 6, 5, 4 (e.g., when switching the converter from the second steady state to the first steady state). In addition, the capacitor units C1 and C2 get charged when switching the switches $S_{U3}$, $S_{U2}$ and $S_{U1}$ of the first series connection $SC_U$ from the conducting state to the non-conducting state by the sequence of regions 4, 3, 2, 1 (e.g., when switching the converter from the first steady state to the second steady state).

The discharging sequence is opposite to the charging sequence. As shown on the right side of the FIG. 6a the region 1 denotes the second steady state of the converter as the starting state of the switching sequence. After that, in region 6 of the right side of FIG. 6a, the switch $S_{U1}$ is switched to the conducting state while the switches $S_{U2}$ and $S_{U1}$ are in the non-conducting state. As a result, the capacitor unit C1 gets discharged because the current flows out of it, as is shown in FIG. 8c that corresponds to region 6 of FIG. 6. Thus, the current flow through the capacitor unit C1 (charging the capacitor unit C1) of region 3 of FIG. 6, shown in FIG. 7c, is opposite to the current flow through the capacitor unit C1 (discharging the capacitor unit C1) of region 6 of FIG. 6, shown in FIG. 8c. Next, as shown in region 5 of the right side of FIG. 6a, the switch $S_{U2}$ is switched to the conducting state while the switch $S_{U1}$ is kept in the conducting state and the switch $S_{U3}$ is kept in the non-conducting state. As a result, the capacitor unit C2 gets discharged because the current Ice flows out of it, as is shown in region 5 of FIG. 6 and FIG. 8b. Thus, the current flow Ice through the capacitor unit C2 (charging the capacitor unit C2) of region 2 of FIG. 6, shown in FIG. 7b, is opposite to the current flow through the capacitor unit C2 (discharging the capacitor unit C2) of region 5 of FIG. 6, shown in FIG. 8b. The discharge rate of the capacitor units is the same as the charge rate of the capacitor units.

It is also possible to only charge the capacitor units C1, C2 during one cycle (e.g., switching the capacitor unit from the second steady state to the first steady state and back again to the second steady state) as shown with regard to capacitor unit C2 on the right side of FIG. 6b, with the switching sequence of regions 1, 2, 3, 4, 2, 1. As shown on the right side of FIG. 6b, the switch $S_{U3}$ is switched to the conducting state before the switch $S_{U2}$ and switched to the non-conducting state after the switch $S_{U2}$. It is also possible to only discharge the capacitor units C1, C2 during one cycle (e.g., switching the capacitor unit from the second steady state to the first steady state and back again to the second steady state) as shown with regard to capacitor unit C2 on the left side of FIG. 6b, with the switching sequence of regions 1, 5, 3, 4, 5, 1. As shown on the left side of FIG. 6b, the switch $S_{U3}$ is switched to the conducting state after the switch $S_{U2}$ and switched to the non-conducting state before the switch $S_{U2}$.

The different switching states of the converter of FIG. 1 are shown on the basis of the switching states of the switches $S_{U3}$, $S_{U2}$ and $S_{U1}$ of the first series connection $SC_U$ in the Table 1 below, wherein the different switching states of the converter are associated to the regions 1, 2, 3, 4, 5, and 6 shown in FIGS. 6, 7 and 8. As indicated already above, in the different switching states of the converter the switches $S_{L3}$, $S_{L2}$ and $S_{L1}$ of the second series connection $SC_L$ are in the opposite/inverse switching state with respect to the corresponding switch of the first series connection $SC_U$. In Table 1, a "0" indicates that a switch is in the non-conducting state and a "1" indicates that a switch is in the conducting state. Table 1 also indicates for the different switching states whether the capacitor units C1, C2 are charged ("Ch"), discharged ("Dis") or neither of both ("–"). In Table 1, the term "second steady state" is abbreviated by "SSS", the term "transition phase" (which also may be referred to as transition state) is abbreviated as "TP" and the term "first steady state" is abbreviated as "FSS".

TABLE 1

Different states of the converter of FIG. 1

Figure 7:
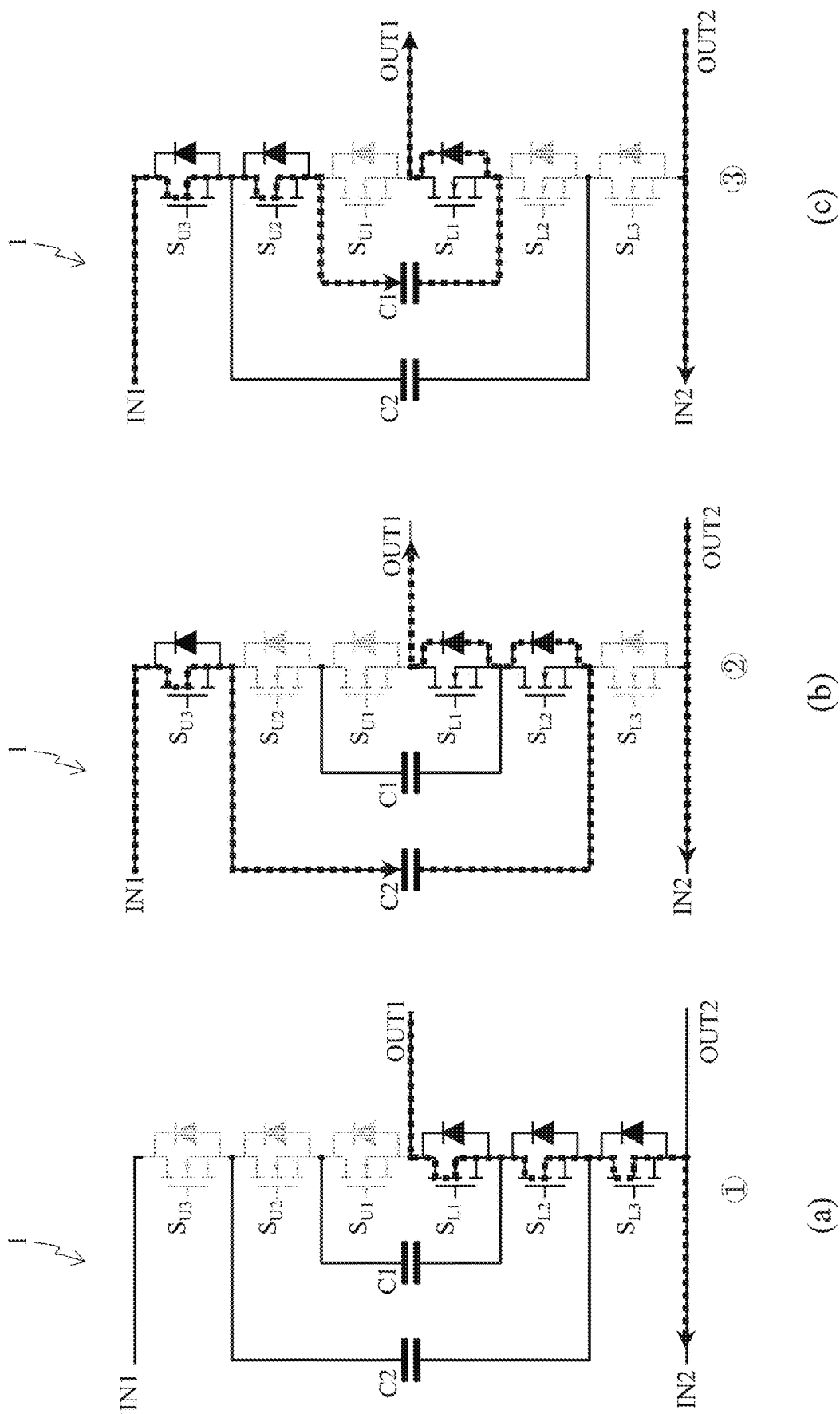
FIG. 7 shows three different switching states of the converter of FIG. 1, when operating the converter of FIG. 1 according to an example of the method according to an embodiment of the disclosure.
Figure 8:
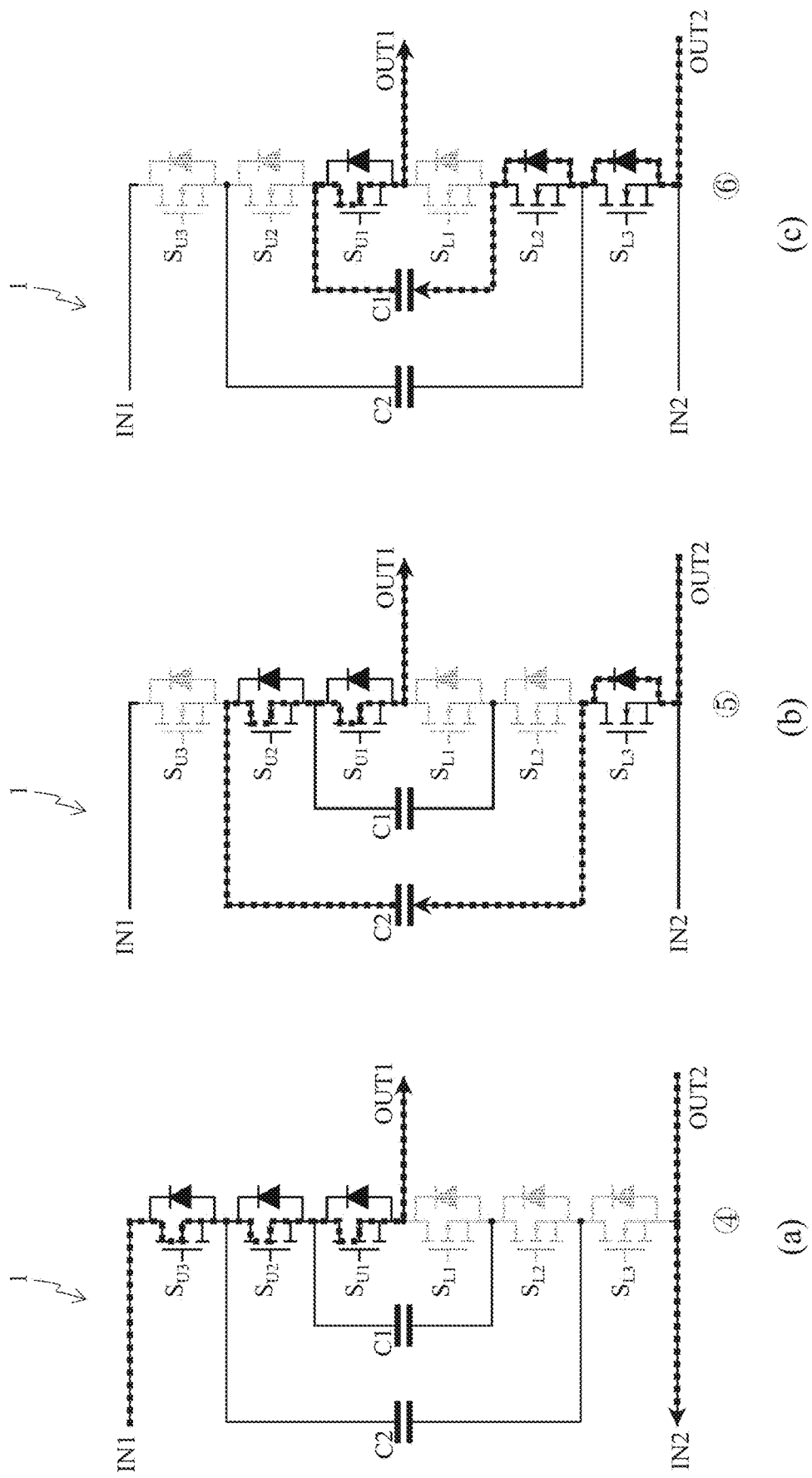
FIG. 8 shows three different switching states of the converter of FIG. 1, when operating the converter of FIG. 1 according to an example of the method according to an embodiment of the disclosure.

| regions shown in FIGS. 6, 7 and 8 | 1 | 2 | 3 | 4 | 5 | 6 |
|---|---|---|---|---|---|---|
| state of converter | SSS | TP | TP | FSS | TP | TP |
| $S_{U3}$ | 0 | 1 | 1 | 1 | 0 | 0 |
| $S_{U2}$ | 0 | 0 | 1 | 1 | 1 | 0 |
| $S_{U1}$ | 0 | 0 | 0 | 1 | 1 | 1 |
| C1 | — | — | Ch | — | — | Dis |
| C2 | — | Ch | — | — | Dis | — |

FIGS. 7 and 8 each show three different switching states of the converter of FIG. 1, when operating the converter of FIG. 1 according to an example of the method according to an embodiment of the disclosure. In FIGS. 7 and 8 the current flow through the converter is shown as a bold dotted line.

The switching state of FIG. 7a corresponds to the second steady state of the converter and, thus, to the region 1 of FIG. 6. In this state, the capacitor units C1 and C2 get neither charged nor discharged. The switching state of FIG. 7b corresponds to a transition phase of the converter, in which the capacitor unit C2 gets charged. This state corresponds to region 2 of FIG. 6. The switching state of FIG. 7c corresponds to a transition phase of the converter, in which the capacitor unit C1 gets charged. This state corresponds to region 3 of FIG. 6.

The switching state of FIG. 8a corresponds the first steady state of the converter and, thus, to the region 4 of FIG. 6. In this state, the capacitor units C1 and C2 get neither charged nor discharged. The switching state of FIG. 8b corresponds to a transition phase of the converter, in which the capacitor unit C2 gets discharged. This state corresponds to region 5 of FIG. 6. The switching state of FIG. 8c corresponds to a transition phase of the converter, in which the capacitor unit C1 gets discharged. This state corresponds to region 6 of FIG. 6.

For determining the power loss of the switches $S_{U3}$, $S_{U2}$, $S_{U1}$, $S_{L1}$, $S_{L2}$ and $S_{L3}$ of the converter and, thus, the health state of the switches, the temperature of each switch as an indicator of the power loss of the respective switch may be measured. The higher the power loss of a switch, the higher the stress on the switch and, thus, the worse the health state of the switch.

Therefore, the switch with the highest temperature and, thus, highest power loss among the switches $S_{U3}$, $S_{U2}$, $S_{U1}$, $S_{L1}$, $S_{L2}$ and $S_{L3}$ is the switch with the worst health state among the switches $S_{U3}$, $S_{U2}$, $S_{U1}$, $S_{L1}$, $S_{L2}$ and $S_{L3}$. As a result, the switches $S_{U3}$, $S_{U2}$, $S_{U1}$, $S_{L1}$, $S_{L2}$ and $S_{L3}$ may be controlled such that a portion of the voltage Vin (received by the input terminals IN1, IN2) that is distributed to the switch with the highest power loss is reduced.

In other words, the switches $S_{U3}$, $S_{U2}$, $S_{U1}$, $S_{L1}$, $S_{L2}$ and $S_{L3}$ may be controlled such that the capacitor units C1, C2 are charged and/or discharged so that the voltage distributed to the switch with the highest power loss is reduced and the amount of voltage, by which the voltage distributed to the switch with the highest power loss is reduced, is redistributed to the other switches of the converter. As a result, the stress on the switch with the highest power loss may be reduced. The stress of the other switches may not be significantly increased as a result of the redistribution because the redistributed amount of voltage may be equally redistributed among the other switches so that the voltage redistributed to each of the other switches is not so much.

According to an embodiment, the combined power loss of each switch pair of the converter, that is the combined power loss of the two switches of each switch pair, may be determined.

As outlined already above, the switches $S_{U1}$ and $S_{L1}$, the switches $S_{U2}$ and $S_{L2}$ and the switches $S_{U3}$ and $S_{L3}$ each form a switch pair. The switch pair with the highest combined power loss among the combined power losses of the switched pairs of the converter may be determined. By determining the switch pair with the highest combined power loss the switch pair with the worst health state among the switch pairs may be determined The switches $S_{U3}$, $S_{U2}$, $S_{U1}$, $S_{L1}$, $S_{L2}$ and $S_{L3}$ may then be controlled such that a portion of the voltage Vin (received by the input terminals IN1, IN2) that is distributed to the two switches of the switch pair with the highest combined power loss is reduced.

For determining the combined power loss of a switch pair of the converter the sum of the temperature of the first switch of the switch pair and the temperature of the second switch of the switch pair may be determined, in particular computed. Namely, the sum of these two temperatures may be an indicator for the combined power loss of the switch pair.

Figure 9:
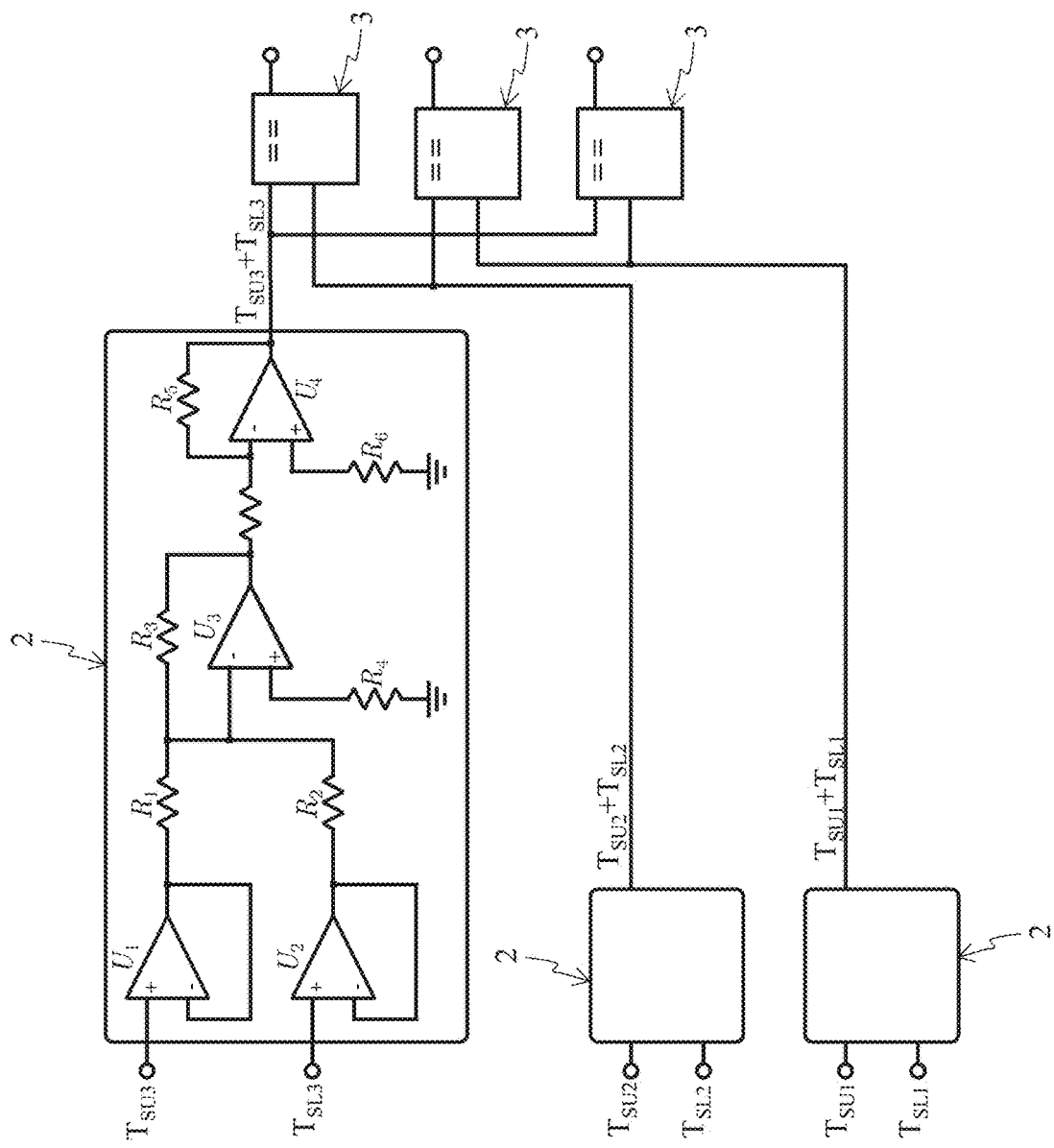
FIG. 9 shows an example of a part, of a control unit according to an embodiment of the disclosure, for determining power loss of the switches of the converter of FIG. 1.

FIG. 9 shows an example of a part, of a control unit according to an embodiment of the disclosure, for determining power loss of the switches of the converter of FIG. 1.

The part of the control unit shown in FIG. 9 is configured to determine the combined power loss of the switch pairs of the converter by determining the temperatures of the switch pairs and to determine the switch pair with the highest power loss by comparing the temperatures of the switch pairs with each other. For this the temperatures $T_{SU3}$, $T_{SU2}$, $T_{SU1}$, $T_{SL1}$, $T_{SL2}$, $T_{SL3}$ of the switches $S_{U1}$, $S_{U2}$, $S_{U1}$, $S_{L1}$, $S_{L2}$ and $S_{L3}$ are measured using known methods, that is the temperature of each switch is measured using known methods. Then the temperature of the two switches of each switch pair are added to compute an indicator for the combined power loss of the respective switch pair. That is, as shown in FIG. 9, the temperatures $T_{SU1}$ and $T_{SL3}$ are added ($T_{SU3}+T_{SL3}$) so that the sum of these two temperatures is an indicator for the combined power loss of the switch pair comprising the switches $S_{U1}$ and $S_{L3}$. The temperatures $T_{SU2}$ and $T_{SL2}$ are added ($T_{SU2}+T_{SL2}$) so that the sum of these two temperatures is an indicator for the combined power loss of the switch pair comprising the switches $S_{U2}$ and $S_{L2}$. The temperatures $T_{SU1}$ and $T_{SL1}$ are added ($T_{SU1}+T_{SL1}$) so that the sum of these two temperatures is an indicator for the combined power loss of the switch pair comprising the switches $S_{U1}$ and $S_{L1}$. For this computation an example is shown in FIG. 9 with respect to adding the temperatures $T_{SU3}$ and $T_{SL3}$. This is only by way of example and, thus, the temperatures may additionally or alternatively be computed by different known methods.

As shown in FIG. 9, after measuring the temperatures $T_{SU3}$ and $T_{SL3}$ of the switches $S_{U3}$ and $S_{L3}$, the measurement results are amplified with an emitter follower circuit using operational amplifiers $U_1$ and $U_2$. The amplified signals are then applied to an inverting summation circuit comprising resistors $R_1$, $R_2$, $R_3$ and $R_4$ and operational amplifier $U_3$. The block for computing the addition of the temperatures $T_{SU3}$ and $T_{SL3}$ ($T_{SU3}+T_{SL3}$) may in addition comprise the operational amplifier $U_4$ and the resistors $R_5$ and $R_6$. Next the sums of the respective temperatures representing the respective combined power losses of the switch pairs are compared using comparing units 3. Thus, the part of the control unit shown in FIG. 9 is configured to determined the switch pair with the highest combined power loss among the switch pairs on the basis of the measured temperatures of the switches.

According to an example scenario the temperatures of the switches $S_{U3}$, $S_{U2}$, $S_{U1}$, $S_{L1}$, $S_{L2}$ and $S_{L3}$ may be as follows:

$T_{SU3}=60°$ C.,$T_{SU2}=30°$ C.,$T_{SU1}=32°$ C.,$T_{SL1}=35°$ C.,$T_{SL2}=29°$ C. and $T_{SL3}=30°$ C.

Thus, the combined temperatures are as follows:

$T_{SU3}+T_{SL3}=90°$ C.>$T_{SU1}+T_{SL1}=67°$ C.>$T_{SU2}+T_{SL2}=59°$ C.

That is, the switch pair comprising the switches $S_{U3}$ and $S_{L3}$ has the highest combined power loss among the switch pairs, because the sum of the temperatures of the two switches $S_{U3}$ and $S_{L3}$ is higher than the sum of the temperatures of the two switches of the other switch pairs. The switch pair comprising the switches $S_{U2}$ and $S_{L2}$ has the lowest combined power loss among the switch pairs, because the sum of the temperatures of the two switches $S_{U2}$ and $S_{L2}$ is lower than the sum of the temperatures of the two switches of the other switch pairs.

Therefore, in the above scenario, for increasing the lifetime of the converter the stress and, thus, voltage applied to the switches $S_{U3}$ and $S_{L3}$ may be reduced by a voltage amount. This voltage amount may then be equally redistributed to the other switches $S_{U2}$, $S_{U1}$, $S_{L1}$, $S_{L2}$ of the converter. Alternatively, this voltage amount may then be redistributed, such that more of said voltage amount is distributed to the switches $S_{U2}$ and $S_{L2}$ than to the switches $S_{U1}$ and $S_{L1}$, because the combined power loss of the switch pair comprising the switches $S_{U1}$ and $S_{L1}$ is higher than the combined power loss of the switch pair comprising the switches $S_{U2}$ and $S_{L2}$.

For achieving this, the capacitor unit C2 may get charged above the respective third voltage level (2Vin/3), but below the voltage Vin received by the input terminals IN1 and IN2.

As a result thereof, the portion of the voltage Vin distributed to the switches $S_{U3}$ and $S_{L3}$ is reduced. This reduces the power losses of the switches $S_{U3}$ and $S_{L3}$ and, thus, reduces the stress on the switches $S_{U3}$ and $S_{L3}$. Charging the capacitor unit C2 above the respective third voltage level (2Vin/3) increases the rest portion of the voltage Vin distributed to the other switches $S_{U2}$, $S_{U1}$, $S_{L1}$, $S_{L2}$. This rest portion is increased by the same degree/extent as the portion of the voltage Vin distributed to the switches $S_{U3}$ and $S_{L3}$ is reduced. For redistributing power losses of the switches $S_{U1}$ and $S_{L1}$ to the switches $S_{U2}$ and $S_{L2}$, the capacitor unit C1 may get charged or discharged to a voltage level that is lower/smaller than the respective third voltage level of the capacitor unit C1 (Vin/3), but higher than 0 V.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for operating a converter, comprising:
compensating different power losses of two or more switches of the converter by controlling the two or more switches such that
at least one of one or more capacitor units of the converter is charged above a respective third voltage level, and/or
at least one of the one or more capacitor units is charged below the respective third voltage level,
so that DC voltage is not equally distributed to the two or more switches, wherein the converter includes a multilevel converter, wherein the converter comprises: a first input terminal and a second input terminal for receiving a DC voltage, an output terminal for providing an output voltage variable between a first voltage level and a second voltage level, a first series connection and a second series connection of the two or more switches that are semiconductor switches, and the one or more capacitor units, wherein the first input terminal is electrically connected via the first series connection of the two or more switches to the output terminal, wherein the second input terminal is electrically connected via the second series connection of the two or more switches to the output terminal, wherein each of the one or more capacitor units electrically connects a first node between two switches of the first series connection and a second node between two switches of the second series connection with each other, wherein a number of nodes between the first node and the output terminal and a number of nodes between the second node and the output terminal are equal to each other, and wherein the DC voltage is equally distributable to the two or more switches of the first and second series connection by controlling the two or more switches such that each of the one or more capacitor units is charged to a respective third voltage level.

2. The method according to claim 1, wherein the compensating the different power losses of the two or more switches comprises:
compensating the different power losses of the two or more switches by controlling the two or more switches such that
at least one of the one or more capacitor units gets charged above the respective third voltage level, and/or
at least one of the one or more capacitor units gets charged or discharged below the respective third voltage level;
during one or more transition phases between a first steady state of the converter, at which the output voltage equals to the first voltage level, and a second steady state of the converter, at which the output voltage equals to the second voltage level.

3. The method according to claim 1, further comprising:
determining a power loss of each of one or more of the two or more switches, by measuring a temperature of a respective switch as an indicator of a power loss of the respective switch.

4. The method according to claim 1, further comprising:
determining a switch with a highest power loss among the power losses of the two or more switches; and
controlling the two or more switches such that a portion of the DC voltage distributed to the switch with the highest power loss is reduced.

5. The method according to claim 4, further comprising:
controlling the two or more switches such that the portion of the DC voltage distributed to the switch with the highest power loss is reduced and other portion of the DC voltage is equally distributed to other one or more switches of the two or more switches.

6. The method according to claim 1, further comprising:
determining a combined power loss of each switch pair of a plurality of switch pairs comprising a first switch of the first series connection and a second switch of the second series connection, wherein a number of switches between the first switch and the output terminal and a number of switches between the second switch and the output terminal are equal to each other;
determining a switch pair of the plurality of switch pairs with a highest combined power loss among combined power losses of the plurality of switch pairs of the first series connection and the second series connection; and
controlling the two or more switches such that a portion of the DC voltage distributed to the first switch and second switch of the switch pair with the highest combined power loss is reduced.

7. The method according to claim 6, further comprising:
controlling the two or more switches such that the portion of the DC voltage distributed to the first switch and second switch of the switch pair with the highest combined power loss is reduced and other portion of the DC voltage is equally distributed to other one or more switches of the two or more switches.

8. The method according to claim 6, further comprising:
determining a combined power loss of each of one or more of the plurality of switch pairs by determining a sum of a temperature of a first switch of a respective switch pair and a temperature of a second switch of the respective switch pair as an indicator for the combined power loss of the respective switch pair.

9. The method according to claim 1, wherein for reducing a portion of the DC voltage (Vin) distributed to a switch that is electrically connected to the output terminal, the method further comprising:
controlling the two or more switches such that a capacitor unit of the one or more capacitor units is charged below a respective third voltage level, wherein the capacitor unit is electrically connected to the first node of the first series connection and the second node of the second series connection that are closest, in terms of the number of nodes, to the output terminal.

10. The method according to claim 9, wherein
the less the capacitor unit is charged below the respective third voltage level, the more the portion of the DC voltage distributed to the switch is reduced.

11. The method according to claim 9, wherein for reducing the portion of the DC voltage distributed to the switch, the method further comprising:
controlling the two or more switches such that the capacitor unit of the one or more capacitor units gets charged or discharged below the respective third voltage level, during one or more transition phases.

12. The method according to claim 11, wherein
the less the capacitor unit gets charged below the respective third voltage level, the more the portion of the DC voltage distributed to the switch is reduced, or
the more the capacitor unit gets discharged below the respective third voltage level, the more the portion of the DC voltage distributed to the switch is reduced.

13. The method according to claim 1, wherein for reducing a portion of the DC voltage distributed to a switch that is electrically connected via one or more switches to the output terminal, the method further comprising:
controlling the two or more switches such that a first capacitor unit of the one or more capacitor units is charged above the respective third voltage level, wherein the first capacitor unit is connected to a terminal of two terminals of the switch that is closer, in terms of the number of nodes, to the output terminal; and/or
controlling the two or more switches such that a second capacitor unit of the one or more capacitor units is charged below the respective third voltage level, wherein the second capacitor unit is connected to other terminal of the two terminals of the switch.

14. The method according to claim 13, wherein
the more the first capacitor unit is charged above the respective third voltage level, the more the portion of the DC voltage distributed to the switch is reduced; and/or
the less the second capacitor unit is charged below the respective third voltage level, the more the portion of the DC voltage distributed to the switch is reduced.

15. The method according to claim 13, wherein for reducing the portion of the DC voltage distributed to the switch, the method further comprising:
controlling the two or more switches such that the first capacitor unit of the one or more capacitor units gets charged above the respective third voltage level, during one or more transition phases; and/or
controlling the two or more switches such that the second capacitor unit of the one or more capacitor units gets charged or discharged below the respective third voltage level, during the one or more transition phases.

16. The method according to claim 15, wherein
the more the first capacitor unit gets charged above the respective third voltage level, the more the portion of the DC voltage distributed to the switch is reduced; and/or
the less the second capacitor unit gets charged below the respective third voltage level, the more the portion of the DC voltage distributed to the switch is reduced, or
the more the second capacitor unit gets discharged below the third voltage level, the more the portion of the DC voltage distributed to the switch is reduced.

17. The method according to claim 1, wherein
the higher the number of nodes between the output terminal and the first node, to which a capacitor unit is connected to, the greater is the respective third voltage level of the capacitor unit.

18. A control unit for a converter, wherein the converter includes a multilevel converter, wherein,
for controlling two or more switches of the converter, the control unit is configured to:
compensate different power losses of two or more switches of the converter by controlling the two or more switches such that
at least one of one or more capacitor units of the converter is charged above a respective third voltage level, and/or
at least one of the one or more capacitor units is charged below the respective third voltage level,
so that DC voltage is not equally distributed to the two or more switches, wherein the converter comprises:
a first input terminal and a second input terminal for receiving a DC voltage, an output terminal for providing an output voltage variable between a first voltage level and a second voltage level, a first series connection and a second series connection of the two or more switches that are semiconductor switches, and the one or more capacitor units, wherein the first input terminal is electrically connected via the first series connection of the two or more switches to the output terminal, wherein the second input terminal is electrically connected via the second series connection of the two or more switches to the output terminal, wherein each of the one or more capacitor units electrically connects a first node between two switches of the first series connection and a second node between two switches of the second series connection with each other, wherein a number of nodes between the first node and the output terminal and a number of nodes between the second node and the output terminal are equal to each other, and wherein the DC voltage is equally distributable to the two or more switches of the first and second series connection by controlling the two or more switches such that each of the one or more capacitor units is charged to a respective third voltage level.

19. A converter, wherein the converter includes a multilevel converter, wherein the converter comprises:
a first and second input terminal for receiving a DC voltage,
an output terminal for providing an output voltage that is variable between a first voltage level and a second voltage level,
a first series connection and a second series connection of two or more switches that are semiconductor switches,
one or more capacitor units, and
a control unit for controlling the switches;

wherein the first input terminal is electrically connected via the first series connection of the two or more switches to the output terminal;

wherein the second input terminal is electrically connected via the second series connection of the two or more switches to the output terminal;

wherein each of the one or more capacitor units electrically connects a first node between two switches of the first series connection and a second node between two switches of the second series connection with each other, wherein the number of nodes between the first node and the output terminal and the number of nodes between the second node and the output terminal are equal to each other; and wherein the control unit is configured to equally distribute the DC voltage to the switches of the first and second series connection by controlling the switches such that each of the one or more capacitor units is charged to a respective third voltage level, and compensate different power losses of the switches by controlling the switches such that one or more of the one or more capacitor units are charged above the respective third voltage level, and/or one or more of the one or more capacitor units are charged below the respective third voltage level, so that the DC voltage (Vin) is not equally distributed to the switches.

20. The converter according to claim 19, wherein each capacitor unit corresponds to a capacitor or to two capacitors electrically connected in series; and in case each capacitor unit corresponds to two capacitors electrically connected in series, the converter comprises a series connection of two capacitors electrically connecting the first input terminal and the second input terminal of the converter with each other.

\* \* \* \* \*